US009846433B2

(12) United States Patent
Tanaka

(10) Patent No.: US 9,846,433 B2
(45) Date of Patent: Dec. 19, 2017

(54) AUTONOMOUS TRAVELING VEHICLE AND REPRODUCTION TRAVEL METHOD

(71) Applicant: MURATA MACHINERY, LTD., Kyoto-shi, Kyoto (JP)

(72) Inventor: Shoji Tanaka, Kyoto (JP)

(73) Assignee: MURATA MACHINERY, LTD., Kyoto (JP)

(*) Notice: Subject to any disclaimer, the term of this patent is extended or adjusted under 35 U.S.C. 154(b) by 10 days.

(21) Appl. No.: 15/033,934

(22) PCT Filed: Oct. 16, 2014

(86) PCT No.: PCT/JP2014/077572
§ 371 (c)(1),
(2) Date: May 3, 2016

(87) PCT Pub. No.: WO2015/068550
PCT Pub. Date: May 14, 2015

(65) Prior Publication Data
US 2016/0274588 A1    Sep. 22, 2016

(30) Foreign Application Priority Data

Nov. 11, 2013  (JP) ................................. 2013-233178

(51) Int. Cl.
*G05D 1/02* (2006.01)
*G05D 1/00* (2006.01)
*G01C 21/00* (2006.01)

(52) U.S. Cl.
CPC .......... *G05D 1/0221* (2013.01); *G01C 21/00* (2013.01); *G05D 1/0088* (2013.01); *G05D 2201/0203* (2013.01)

(58) Field of Classification Search
CPC ............... G05D 1/0221; G05D 1/0088; G05D 2201/0203; G01C 21/00
See application file for complete search history.

(56) References Cited

U.S. PATENT DOCUMENTS 5,375,059 A * 12/1994 Kyrtsos .............. B60K 31/0008
342/357.24
6,633,800 B1 * 10/2003 Ward .................... B60W 50/02
180/167

(Continued)

FOREIGN PATENT DOCUMENTS

JP      03-099305 A    4/1991
JP      05-216530 A    8/1993

(Continued)

OTHER PUBLICATIONS

Official Communication issued in International Patent Application No. PCT/JP2014/077572, dated Jan. 13, 2015.

(Continued)

*Primary Examiner* — Rami Khatib
*Assistant Examiner* — Jeffrey C Boomer
(74) *Attorney, Agent, or Firm* — Keating & Bennett, LLP

(57) ABSTRACT

An autonomous traveling vehicle is controlled to faithfully reproduce a planned traveling route and to autonomously travel. The autonomous traveling vehicle includes a platform, a traveling unit, a teaching unit, a curvature calculation unit, and a control parameter adjustment unit. The traveling unit is mounted on the platform and controls the platform to travel. In a teaching travel mode, the teaching unit acquires subgoal points. The teaching unit stores planned traveling route data as an aggregate of the subgoal points. The curvature calculation unit calculates and stores a key curvature radius. In a reproduction travel mode, the control parameter adjustment unit adjusts a control parameter to determine an direction angle feedback control amount of the traveling unit based on the key curvature radius calculated by the curvature calculation unit.

9 Claims, 18 Drawing Sheets

(56) References Cited

U.S. PATENT DOCUMENTS

| | | | | |
|---|---|---|---|---|
| 8,606,495 B2* | 12/2013 | Makela | ............... | E21C 35/08 180/167 |
| 8,744,746 B2* | 6/2014 | Makela | ............... | G05D 1/0246 701/23 |
| 2001/0024098 A1* | 9/2001 | Takahashi | ............... | G05B 19/41 318/569 |
| 2003/0010545 A1* | 1/2003 | Takeuchi | ............... | B60L 11/1805 180/6.28 |
| 2006/0178823 A1* | 8/2006 | Eglington | ............... | A01B 69/007 701/414 |
| 2006/0253224 A1* | 11/2006 | Tani | ............... | G05D 1/0242 700/245 |
| 2009/0043439 A1* | 2/2009 | Barfoot | ............... | G05D 1/0297 701/25 |
| 2011/0226282 A1* | 9/2011 | Choi | ............... | A47L 9/009 134/18 |
| 2012/0095639 A1* | 4/2012 | Makela | ............... | E21F 13/025 701/25 |
| 2013/0220714 A1* | 8/2013 | Rudinec | ............... | F42D 1/10 180/65.1 |
| 2013/0311153 A1* | 11/2013 | Moughler | ............... | G06Q 10/047 703/6 |
| 2015/0354968 A1* | 12/2015 | Mizuno | ............... | G09B 29/106 701/534 |
| 2017/0060137 A1* | 3/2017 | Shitamoto | ............... | G05D 1/0016 |

FOREIGN PATENT DOCUMENTS

| | | |
|---|---|---|
| JP | 08-326025 A | 12/1996 |
| JP | 2004-058190 A | 2/2004 |

OTHER PUBLICATIONS

English translation of Official Communication issued in International Application PCT/JP2014/077572, dated May 17, 2016.

* cited by examiner

|  |  |  | 500a |
|---|---|---|---|
| $x_0$ | $y_0$ | $\theta_0$ | 500a-0 |
| $x_1$ | $y_1$ | $\theta_1$ | 500a-1 |
| ⋮ | ⋮ | ⋮ |  |
| $x_k$ | $y_k$ | $\theta_k$ | 500a-k |
| ⋮ | ⋮ | ⋮ |  |
| $x_n$ | $y_n$ | $\theta_n$ | 500a-n |

Aggregate of subgoal points ($G_s$)　　Aggregate of direction angles ($G_\theta$)

FIG. 7C

AUTONOMOUS TRAVELING VEHICLE AND REPRODUCTION TRAVEL METHOD

BACKGROUND OF THE INVENTION

1. Field of the Invention

The present invention relates to a control of an autonomous traveling vehicle.

2. Description of the Related Art

There are known an autonomous traveling vehicle or robot that autonomously travels along a traveling route while reproducing the route taught by a user. For instance, JP-A-8-326025 discloses a cleaning robot, which includes a casing equipped with a travel drive unit for traveling on a floor surface, a position detector for detecting a position of the casing on the floor surface, a cleaning unit for cleaning the floor surface, an operation receiving unit for receiving operation inputs for the travel drive unit and the cleaning unit, a storage unit to store a traveling route based on positions detected by the position detector in association with received content of the operation receiving unit, and a controller for reading stored content stored in the storage unit and controlling the travel drive unit and the cleaning unit based on the stored content.

This cleaning robot includes drive wheels and travel motors connected directly to the drive wheels so as to rotate the drive wheels disposed on left and right sides in a middle portion of a bottom surface of the casing. Further, by differentiating rotation speeds of the left and right travel motors, the cleaning robot can turn left and right. In this way, the minimum turning radius is able to be reduced so that cleaning work is able to be efficiently performed. Such a traveling unit, including the left and right pair of drive wheels and the travel motors connected directly to the drive wheels so as to rotate the drive wheels, may be referred to as an opposed two-wheel differential type traveling unit.

In the traveling unit (traveling portion) like the opposed two-wheel differential type traveling unit of the cleaning robot disclosed in JP-A-8-326025, in which rotation speeds or the like of the wheels are independently controlled for changing direction, an optimal value of a control parameter to control the rotation speeds of the wheels may be different between a case where the cleaning robot travels straight (or substantially straight) and a case where the cleaning robot changes the direction.

For instance, in a travel cart (autonomous traveling vehicle) that autonomously travels along a traveling route taught by a user, when the control parameter is set to an optimal value for straight travel, the autonomous traveling vehicle may not be able to travel faithfully along the taught traveling route. It is because that when the autonomous traveling vehicle tries to change the direction, the rotation speeds of the wheels of the traveling unit may not be controlled so that the autonomous traveling vehicle changes the direction as intended. In this case, the autonomous traveling vehicle is not able to travel by faithfully reproducing the taught traveling route in an autonomous travel mode.

SUMMARY OF THE INVENTION

Preferred embodiments of the present invention control an autonomous traveling vehicle to travel by faithfully reproducing a planned traveling route when the autonomous traveling vehicle autonomously travels.

Hereinafter, a plurality of preferred embodiments of the present invention will be described. The features and elements of these preferred embodiments is able to be arbitrarily combined as necessary.

An autonomous traveling vehicle according to a preferred embodiment of the present invention executes a teaching travel mode in which a planned traveling route is taught, and a reproduction travel mode in which the autonomous travelling vehicle travels autonomously while reproducing the planned traveling route. The planned traveling route is a traveling route taught by a user when traveling from a travel start position to a travel end position.

The autonomous traveling vehicle includes a platform, a traveling unit, a teaching unit, a curvature calculation unit, and a control parameter adjustment unit.

The traveling unit is mounted on the platform. Further, the traveling unit controls the platform to travel.

The teaching unit acquires subgoal points when the teaching travel mode is executed. Further, the teaching unit stores planned traveling route data as an aggregate of subgoal points. Here, the subgoal points are information of positions through which the platform passes from the travel start position to the travel end position in a travel environment. The planned traveling route data is data expressing the planned traveling route as an aggregate of subgoal points.

The curvature calculation unit calculates and stores a key curvature radius. The key curvature radius is a curvature radius of a partial planned traveling route at a key subgoal point. The key subgoal point is one of the subgoal points included in the planned traveling route data. The partial planned traveling route is a planned traveling route that includes the key subgoal point and a predetermined number of subgoal points before and after the key subgoal point in the planned traveling route data.

The control parameter adjustment unit adjusts a control parameter to determine a control amount of the traveling unit based on the key curvature radius calculated by the curvature calculation unit, when the reproduction travel mode is executed.

In the autonomous traveling vehicle described above, the teaching unit first acquires and stores the planned traveling route data as the aggregate of subgoal points when the teaching travel mode is executed. Next, the curvature calculation unit uses the stored planned traveling route data so as to calculate the key curvature radius at the key subgoal point as each of the subgoal points included in the planned traveling route data and stores the same in the planned traveling route data. Further, when the autonomous traveling vehicle travels while reproducing the planned traveling route based on the planned traveling route data (when the reproduction travel mode is executed), the control parameter adjustment unit adjusts the control parameter based on the calculated key curvature radius. Further, the control amount of the traveling unit is determined by using the adjusted control parameter.

In this way, the autonomous traveling vehicle (the platform) optimally travels along a shape (curvature) of the planned traveling route. This is because that the control parameter adjustment unit adjusts the control parameter based on the key curvature radius, and as a result, the control amount to control the traveling unit is calculated based on the control parameter adjusted based on the key curvature radius.

Accordingly, when the reproduction travel mode is executed, the autonomous traveling vehicle is able to travel while faithfully reproducing the taught planned traveling route.

In the autonomous traveling vehicle, the traveling unit may include a first main wheel and a second main wheel. In this case, the second main wheel is disposed to face the first main wheel. In addition, both of a first main wheel rotation speed and a second main wheel rotation speed may include a first rotation speed and a second rotation speed. The first main wheel rotation speed is a rotation speed of the first main wheel. The second main wheel rotation speed is a rotation speed of the second main wheel. Further, in this case, the second rotation speed may be controlled based on the control amount.

In this way, the opposed two-wheel differential type traveling unit including the first main wheel and the second main wheel is able to be accurately controlled. As a result, the autonomous traveling vehicle is able to travel while faithfully reproducing the taught planned traveling route when the reproduction travel mode is executed.

In the autonomous traveling vehicle, the control amount may be calculated based on the product of the control parameter and a direction angle difference. The direction angle difference is a difference between a current direction angle and a direction angle at a next target travel point. In addition, the direction angle is an angle indicating an direction of the platform.

In this way, even if the position or the direction of the platform (the autonomous traveling vehicle) at the current position is deviated from a proper position or direction due to a slip of the first main wheel and the second main wheel of the traveling unit, the deviation is able to be reduced at the next target travel point. In addition, the autonomous traveling vehicle is able to optimally travel along a shape (curvature) of the planned traveling route. As a result, the autonomous traveling vehicle is able to travel while faithfully reproducing the taught planned traveling route when the reproduction travel mode is executed.

In the autonomous traveling vehicle, the key curvature radius may be stored in association with the subgoal point in the planned traveling data.

In this way, the control parameter adjustment unit is able to extract the key curvature radius from the planned traveling route data so as to determine an optimal control parameter at each subgoal point based on the key curvature radius.

In the autonomous traveling vehicle, the direction angle at the subgoal point may be stored in association with the subgoal point in the planned traveling data. In this way, the direction of the platform at the subgoal point when the teaching travel mode is executed is able to be stored in the planned traveling route data. As a result, the autonomous traveling vehicle faithfully reproduces the direction in the taught planned traveling route based on the planned traveling route data when the reproduction travel mode is executed.

In the autonomous traveling vehicle, the partial planned traveling route may be a traveling route including the key subgoal point, a first subgoal point, and a second subgoal point. The first subgoal point is a subgoal point before the key subgoal point in a traveling direction. The second subgoal point is a subgoal point after the key subgoal point in the traveling direction.

In addition, the first subgoal point and the second subgoal point may be subgoal points closest to the key subgoal point among the subgoal points separated from the key subgoal point by a predetermined distance or more.

In the autonomous traveling vehicle, the curvature calculation unit may calculate a radius of a key circle as the key curvature radius. The key circle is a circle that passes a predetermined number of subgoal points included in the partial planned traveling route. In this way, the curvature calculation unit calculates the key curvature radius more easily.

In the autonomous traveling vehicle, the control amount may be calculated every predetermined control period. In this way, in consideration of a calculation load and the like, the traveling unit is able to be controlled without causing a delay.

The autonomous traveling vehicle may further include a position estimating unit. The position estimating unit estimates the position and/or the direction of the platform in the travel environment.

In this way, the position and the direction of the platform (the autonomous traveling vehicle) is able to be accurately estimated. As a result, it is possible to faithfully reproduce the planned traveling route taught by the user as the planned traveling route data. In addition, because the position and the direction of the autonomous traveling vehicle are accurately estimated, the traveling unit is able to be appropriately controlled so that the autonomous traveling vehicle faithfully travels along the planned traveling route.

A data structure of planned traveling route data according to another preferred embodiment of the present invention is a data structure of planned traveling route data in use by autonomous traveling vehicle including a traveling unit when autonomously traveling along the planned traveling route.

The planned traveling route data includes a subgoal point coordinate value aggregate storage area and a key curvature radius aggregate storage area. The subgoal point coordinate value aggregate storage area stores subgoal points as an aggregate of coordinate values. The key curvature radius aggregate storage area stores an aggregate of key curvature radii.

Further, when the autonomous traveling vehicle autonomously travels along the planned traveling route based on the planned traveling route data, the control parameter to determine the control amount of the traveling unit of the autonomous traveling vehicle is adjusted based on the key curvature radius stored in the key curvature radius aggregate storage area.

Using the planned traveling route data having this data structure, the autonomous traveling vehicle is able to optimally travel along a shape (curvature) of the planned traveling route when the reproduction travel mode is executed. It is because that the control parameter to determine the control amount of the traveling unit is adjusted based on the key curvature radius. As a result, the control amount to control the traveling unit is calculated based on the control parameter adjusted based on the key curvature radius.

Accordingly, the autonomous traveling vehicle is able to travel while faithfully reproducing the taught planned traveling route when the reproduction travel mode is executed.

The planned traveling route data may further include an direction information aggregate storage area. The direction information aggregate storage area stores an aggregate of direction angles that represent information of directions of the autonomous traveling vehicle at the subgoal points.

In this way, the autonomous traveling vehicle is able to faithfully reproduce the directions in the taught planned traveling route based on the planned traveling route data when the reproduction travel mode is executed.

A method according to still another preferred embodiment of the present invention is a method of controlling an autonomous traveling vehicle including a traveling unit to autonomously travel while reproducing a planned traveling route. The method includes calculating a key curvature radius of a partial planned traveling route at a key subgoal point being one of subgoal points included in planned traveling route data expressing the planned traveling route, the partial planned traveling route includes the key subgoal point and a predetermined number of subgoal points before and after the key subgoal point in the planned traveling route data; adjusting a control parameter based on the key curvature radius; and determining a control amount to control the autonomous traveling vehicle to perform reproduction travel based on the control parameter.

In this way, the autonomous traveling vehicle is able to optimally travel along a shape (curvature) of the planned traveling route. As a result, the autonomous traveling vehicle is able to travel while faithfully reproducing the planned traveling route.

When the autonomous traveling vehicle autonomously travels, the autonomous traveling vehicle is able to be controlled so as to travel while faithfully reproducing the planned traveling route.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 7C is a diagram illustrating a data structure of the planned traveling route data.

DETAILED DESCRIPTION OF THE PREFERRED EMBODIMENTS

First Preferred Embodiment

Figure 1:
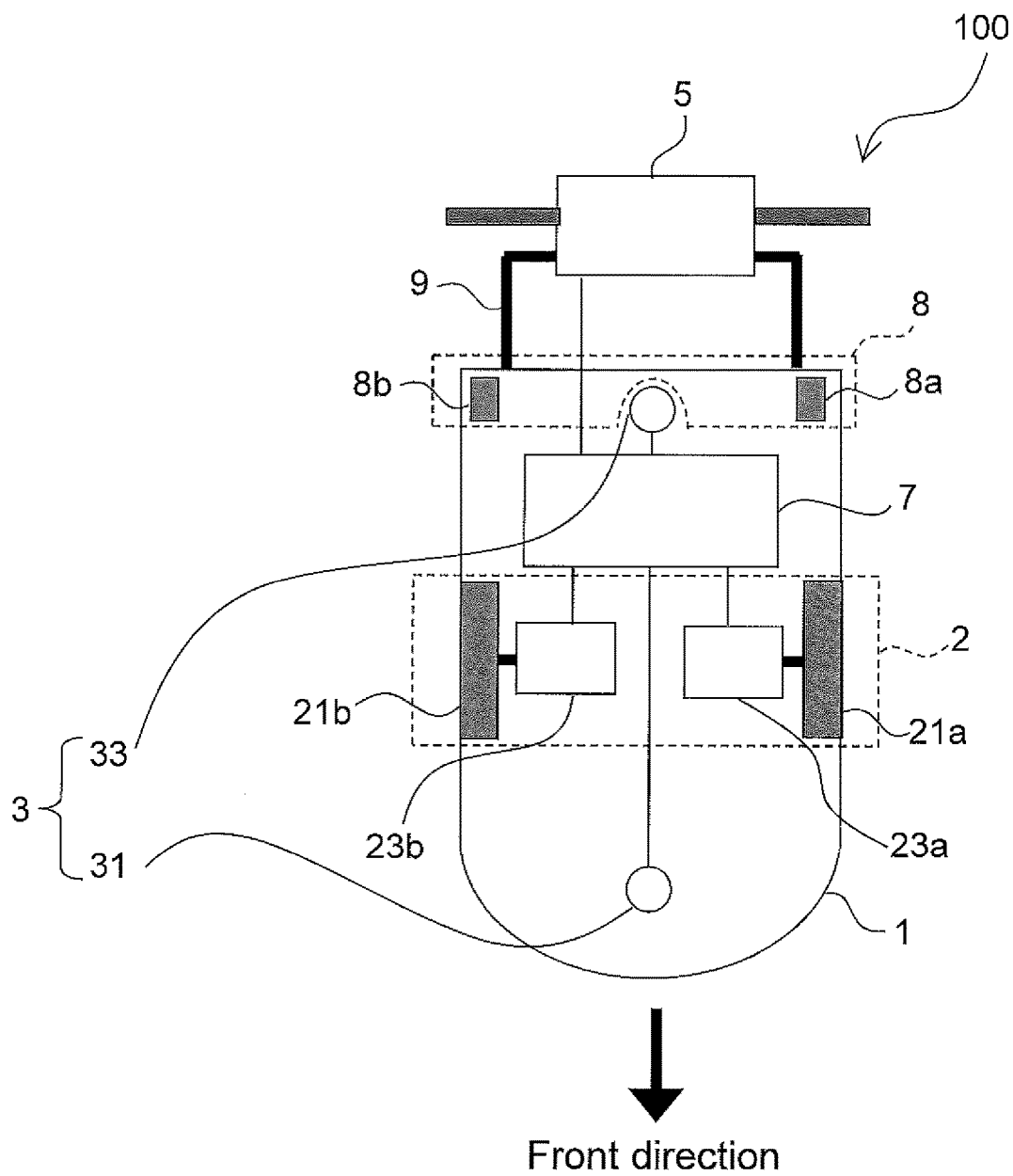
FIG. 1 is a diagram illustrating an overall structure of an autonomous traveling vehicle.

First, an overall structure of an autonomous traveling vehicle according to a first preferred embodiment of the present invention is described with reference to FIG. 1. FIG. 1 is a diagram illustrating an overall structure of the autonomous traveling vehicle. The autonomous traveling vehicle 100 of this preferred embodiment executes a teaching travel mode for teaching a desired planned traveling route from a travel start position to a travel end position by an operation of a user, and a reproduction travel mode for executing an autonomous travel from the travel start position to the travel end position while reproducing the planned traveling route.

The autonomous traveling vehicle 100 includes a platform 1, a traveling unit 2, a detector 3, an operation interface 5, and a controller 7. The platform 1 is a main body of the autonomous traveling vehicle 100. The traveling unit 2 is mounted on the platform 1. The traveling unit 2 controls the platform 1 to travel. The detector 3 is connected to the controller 7 (described later) in a manner capable of transmitting and receiving signals. Further, the detector 3 detects an obstacle, a wall, or the like existing on a traveling route and outputs position information of the obstacle, the wall, or the like to the controller 7. The operation interface 5 is fixed to the upper rear side of the platform 1 via an attachment member 9. In addition, the operation interface 5 is connected to the controller 7 in a manner capable of transmitting and receiving signals. The operation interface 5 is operated by the user when the user teaches the planned traveling route to the autonomous traveling vehicle 100 (when the teaching travel mode is executed). In this way, when the travel mode of the autonomous traveling vehicle 100 is the teaching travel mode, the autonomous traveling vehicle 100 is controlled based on an operation of the operation interface 5 by the user. In addition, the operation interface 5 is used to set the autonomous traveling vehicle 100.

The controller 7 is electrically connected to a first motor 23a (described later) and a second motor 23b (described later) of the traveling unit 2. In addition, the controller 7 is connected to the detector 3 in a manner capable of transmitting and receiving signals. Further, the controller 7 is connected to the operation interface 5 in a manner capable of transmitting and receiving signals. Accordingly, when the teaching travel mode is executed, the controller 7 controls the first motor 23a and the second motor 23b of the traveling unit 2 based on the operation of the operation interface 5 by the user. On the other hand, when the reproduction travel mode is executed so as to autonomously travel while reproducing the planned traveling route, the controller 7 controls the first motor 23a and the second motor 23b of the traveling unit 2 based on planned traveling route data 500c (described later) expressing the planned traveling route taught when the teaching travel mode is executed.

In addition, the controller 7 obtains the position information of an obstacle, a wall, or the like based on a signal (described later) acquired from the detector 3. In addition, the controller 7 obtains the position of the autonomous traveling vehicle 100 on a movement plane (travel environment) based on the position information of the obstacle, the wall, or the like.

Details of structures of the traveling unit 2, the detector 3, the operation interface 5, and the controller 7 of the autonomous traveling vehicle 100 will be described later.

The autonomous traveling vehicle 100 further includes an auxiliary wheel unit 8. The auxiliary wheel unit 8 includes two auxiliary wheels 8a and 8b. The two auxiliary wheels 8a and 8b are attached to the rear bottom portion of the platform 1 in a manner capable of independently rotating. By providing the auxiliary wheel unit 8, the autonomous traveling vehicle 100 is able to move stably and smoothly.

Note that the auxiliary wheel unit 8 may be disposed not only in the rear bottom portion of the platform 1 but also in the front bottom portion of the platform 1 in consideration of a barycenter position of the platform 1.

Next, a structure of the traveling unit 2 is described in detail with reference to FIG. 1. The traveling unit 2 includes a first main wheel 21a, a second main wheel 21b, the first motor 23a, and the second motor 23b. The first main wheel 21a is disposed in a rotatable manner on the front left side in a substantially middle portion of the platform 1. The second main wheel 21b is disposed in a rotatable manner on the front right side in the substantially middle portion of the platform 1 so as to face the first main wheel 21a.

In addition, the first main wheel 21a and the second main wheel 21b are connected to output rotation shafts of the first motor 23a and the second motor 23b, respectively. In this way, the first main wheel 21a rotates when the first motor 23a rotates, while the second main wheel 21b rotates when the second motor 23b rotates.

The first motor 23a and the second motor 23b are electrically connected to the controller 7. The first motor 23a and the second motor 23b is able to be independently controlled by a motor driving unit 75 (described later) of the controller 7. Accordingly, the first motor 23a and the second motor 23b are able to independently generate arbitrary rotation speeds. As a result, the first main wheel 21a and the second main wheel 21b are able to independently control the rotation speeds.

As the first motor 23a and the second motor 23b, an electric motor such as a servo motor and/or a brushless motor may be used, for example.

In this way, the traveling unit 2 including the first main wheel 21a and the second main wheel 21b whose rotation speeds is able to be independently controlled is referred to as an "opposed two-wheel differential type traveling unit".

Next, a structure of the detector 3 is described with reference to FIG. 1. The detector 3 detects an obstacle, a wall, or the like around the traveling route of the autonomous traveling vehicle 100 and outputs position information of the obstacle, the wall, or the like. For this purpose, the detector 3 includes a front detector 31 and a rear detector 33. The front detector 31 detects an obstacle, a wall, or the like in front of the autonomous traveling vehicle 100. The rear detector 33 detects an obstacle, a wall, or the like behind the autonomous traveling vehicle 100. In addition, the front detector 31 and the rear detector 33 output signals having information of a distance between the autonomous traveling vehicle 100 and the obstacle, the wall, or the like, and a direction of the obstacle, the wall, or the like viewed from the autonomous traveling vehicle 100. In this way, the detector 3 is able to output relative position information of the obstacle, the wall, or the like viewed from the autonomous traveling vehicle 100 to the controller 7.

As the front detector 31 and the rear detector 33 of the detector 3, a laser range finder (LRF) or the like that emits light or signal in a range of at least 180 degrees may be used, for example.

Figure 2:
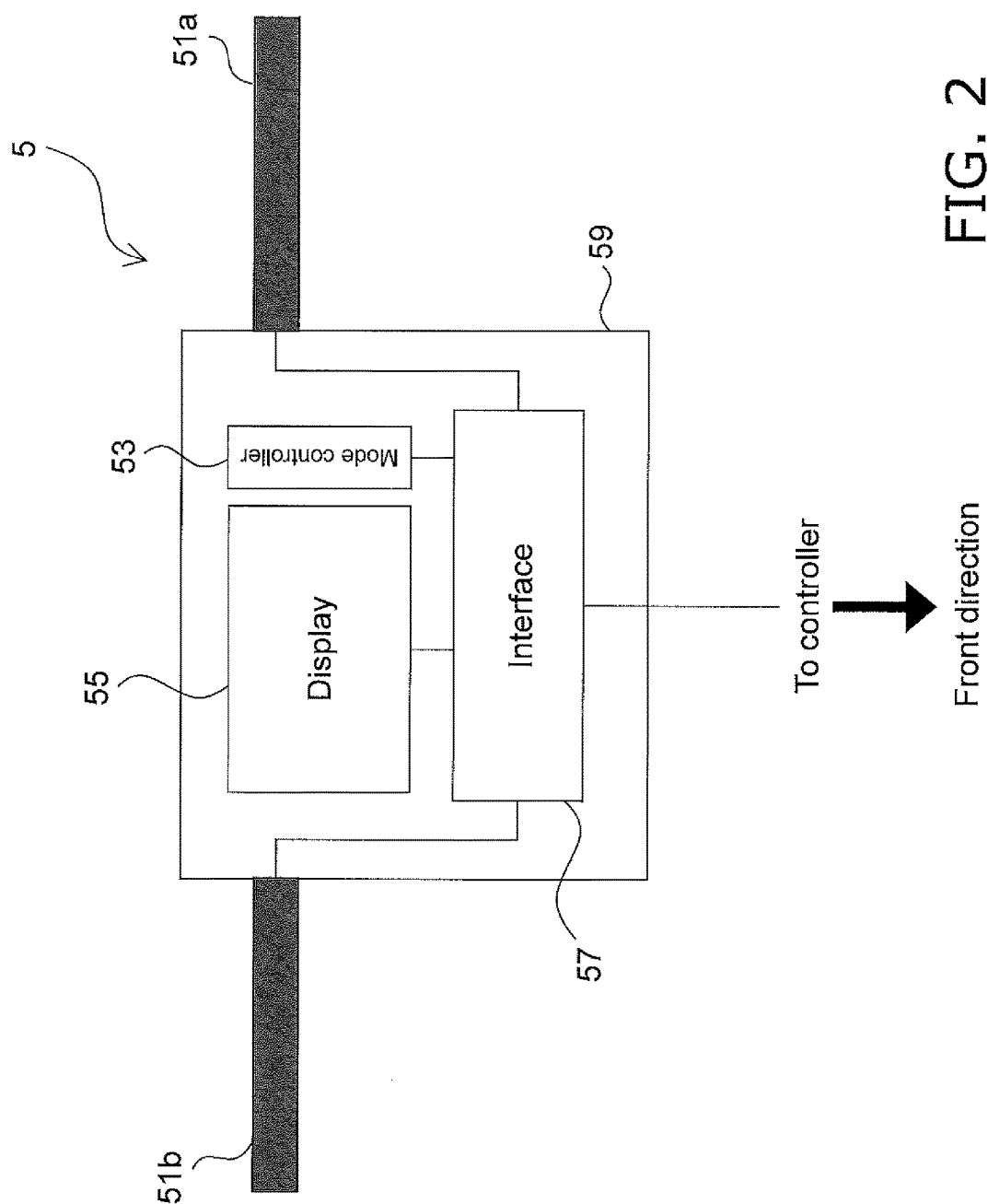
FIG. 2 is a diagram illustrating a structure of an operator.

Next, a structure of the operation interface 5 is described with reference to FIG. 2. FIG. 2 is a diagram illustrating a structure of the operation interface 5. The operation interface 5 includes operation handles 51a and 51b, a mode controller 53, a display 55, an interface 57, and a casing 59.

The operation handles 51a and 51b are attached to the left and right of the casing 59 in a rotatable manner. In addition, the operation handles 51a and 51b are connected to the interface 57 in a manner capable of transmitting and receiving signals. In this way, rotation amounts (operation amounts) and rotation directions of the operation handles 51a and 51b are converted into electric signals in the interface 57 and are output to the controller 7. Further, based on the rotation amounts and the rotation directions of the operation handles 51a and 51b output to the controller 7, the first motor 23a and the second motor 23b of the traveling unit 2 are controlled.

In addition, the operation handle 51a may be an input interface that instructs a traveling speed in the traveling direction, while the operation handle 51b may be an input interface that instructs a steering angle (direction angle (described later)).

In this way, when the teaching travel mode is executed, the user operates the operation handles 51a and 51b so that the autonomous traveling vehicle 100 travels along a desired traveling route (the planned traveling route).

In addition, the user can also operate the autonomous traveling vehicle 100 by applying an appropriate force to the operation handles 51a and 51b. In this case, while the autonomous traveling vehicle 100 is traveling forward, for example, if a force is applied to the operation handle 51a in a direction opposite to the traveling direction of the autonomous traveling vehicle 100, the autonomous traveling vehicle 100 turns left with respect to the traveling direction.

The mode controller 53 is connected to the interface 57. The mode controller 53 switches the travel mode of the autonomous traveling vehicle 100 to the reproduction travel mode or the teaching travel mode. Further, the travel mode set by the mode controller 53 is output to a switch 77 of the controller 7 (FIG. 3) via the interface 57. In addition, the mode controller 53 may be capable of making other various settings of the autonomous traveling vehicle 100.

The mode controller 53 preferably includes, for example, switches and/or a keyboard to make various settings of the travel mode and the like of the autonomous traveling vehicle 100. Alternatively, the mode controller 53 may include a touch panel that may be integral with the display 55.

The display 55 is connected to the interface 57. The display 55 reads out information such as various settings and the position information of the autonomous traveling vehicle 100 from the controller 7 via the interface 57 and displays the same. As the display 55, a display such as a liquid crystal display is able to be used. In addition, if the mode controller 53 and the display 55 are integrally provided as described above, a display with a touch panel function is able to be used as the display 55 (and the mode controller 53).

The interface 57 is connected to the controller 7. The interface 57 converts the rotation amounts and the rotation directions of the operation handles 51a and 51b, the inputs of the switch and/or the key of the mode controller 53, and the like into electric signals and outputs the electric signals to the controller 7. In addition, in accordance with a user's instruction or the like, the interface 57 reads out information of the autonomous traveling vehicle 100 from the controller 7 and displays the information on the display 55.

Accordingly, as the interface 57, a microcomputer board is able to be used. The microcomputer board includes, for example, a signal converter that converts the rotation amounts and the rotation directions of the operation handles 51a and 51b and a setting of the mode controller 53 into electric signals, a display driving circuit that displays information on the display 55, and a communication interface that transmits and receives signals to and from the controller 7.

Figure 3:
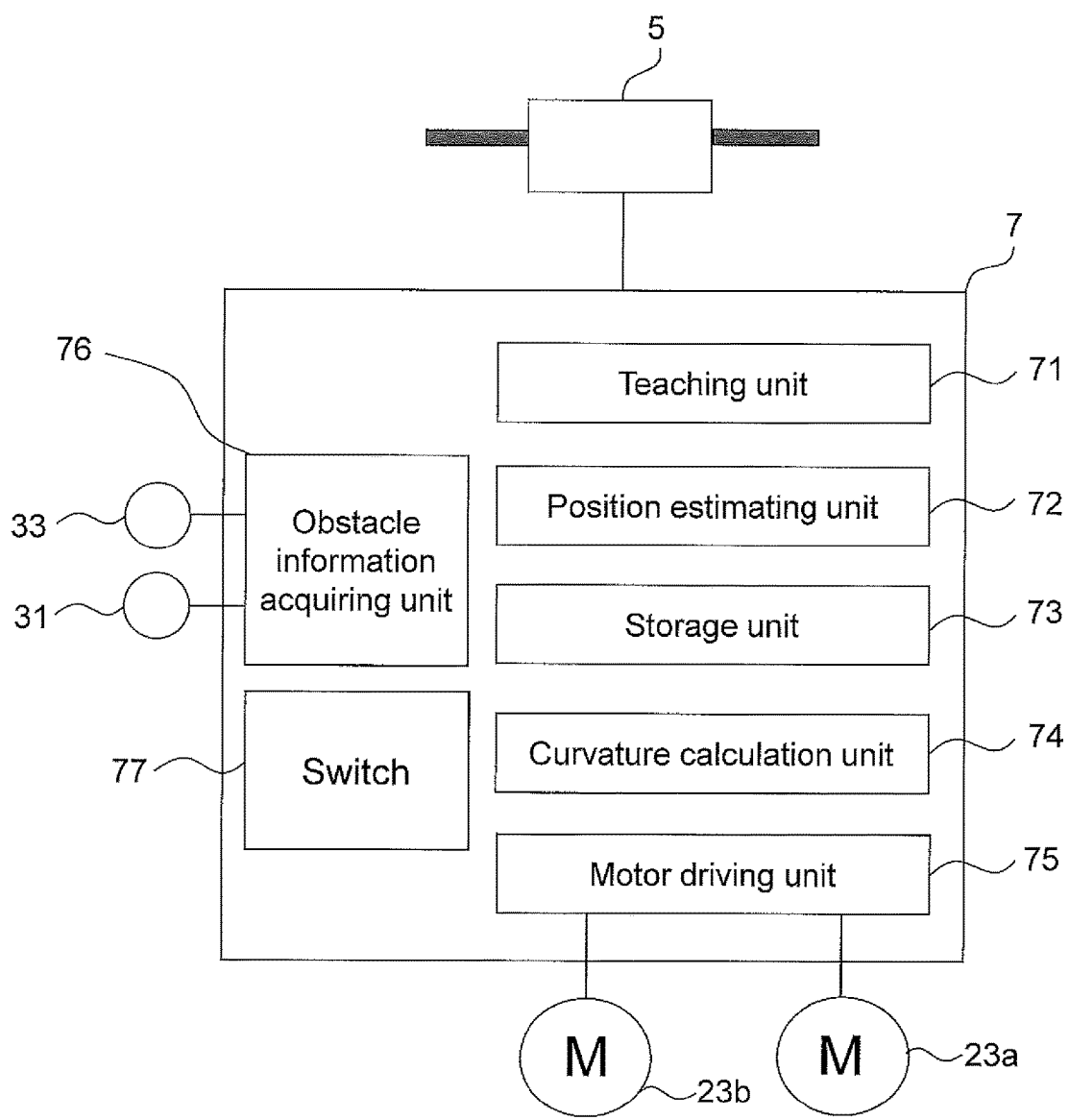
FIG. 3 is a diagram illustrating an overall structure of a controller.

Next, an overall structure of the controller 7 is described with reference to FIG. 3. FIG. 3 is a diagram illustrating an overall structure of the controller 7.

Note that the controller 7 is able to be realized using a microcomputer system or the like, which includes a central processing unit (CPU), a storage including at least one of a hard disk drive, a read only memory (ROM), a random access memory (RAM), a storage medium reading device, and the like, an interface that performs signal conversion, and the like. In addition, some or all of the functions of portions of the controller 7 described below may be realized as a program. Further, the program may be stored in the storage of the microcomputer board. Alternatively, some or all of the functions of portions of the controller 7 may be realized by using a custom IC or other circuitry.

The controller 7 is configured or programmed to include a teaching unit 71, a position estimating unit 72, a storage unit 73, a curvature calculation unit 74, a motor driving unit 75, an obstacle information acquiring unit 76, and the switch 77.

In the teaching travel mode, the teaching unit 71 acquires, at an interval of a predetermined time period (teaching data acquiring time), information of the positions through which the autonomous traveling vehicle 100 has passed when the user operates the autonomous traveling vehicle 100 using the operation interface 5. Further, the teaching unit 71 converts the acquired information of positions into coordinate values on a coordinate system expressing the movement plane on which the autonomous traveling vehicle 100 travels (hereinafter referred to as a movement coordinate system). Further, the teaching unit 71 stores, in the storage unit 73 (described later), the information of positions after the coordinate conversion. Here, the information of position converted into the coordinate value on the movement coordinate system by the teaching unit 71 is referred to as a "subgoal point".

In addition, when the teaching travel mode is executed, the teaching unit 71 continues to acquire subgoal points P from the travel start position of the autonomous traveling vehicle 100 until the user stops the travel of the autonomous traveling vehicle 100 (until the end of the teaching travel mode or until reaching the travel end position). As a result, the teaching unit 71 is able to store an aggregate of subgoal points P acquired from the travel start position to the travel end position in the storage unit 73.

In this way, when the teaching travel mode is executed, positions through which the autonomous traveling vehicle 100 passes by operation of the user are acquired and stored as an aggregate of coordinate values on the movement coordinate system, and hence the traveling route of the autonomous traveling vehicle 100 taught by operation of the user (planned traveling route) is able to be stored in the storage unit 73. Accordingly, the aggregate of subgoal points P acquired by the teaching unit 71 is referred to as planned traveling route data.

Further, when acquiring the subgoal point P, the teaching unit 71 may acquire information of an direction of the autonomous traveling vehicle 100 (the platform 1) at the subgoal point P and may store the same in the storage unit 73. In this case, planned traveling route data 500a (see FIG. 7A) and 500c (see FIG. 7C) are an aggregate of subgoal points P and an aggregate of information of directions of the platform 1 (the autonomous traveling vehicle 100) associated with the subgoal points P.

Figure 4:
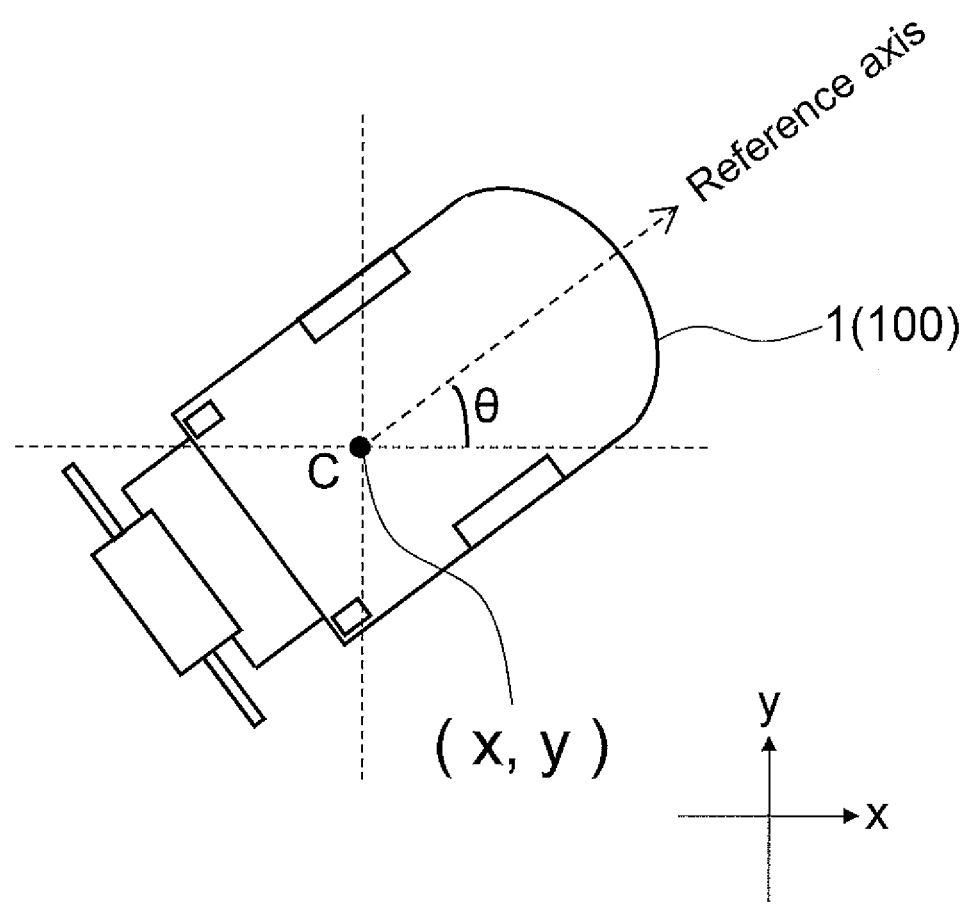
FIG. 4 is a diagram showing a definition of an direction angle of the platform (the autonomous traveling vehicle).

Here, as illustrated in FIG. 4, for example, the direction of the autonomous traveling vehicle 100 is defined as a direction angle $\theta$ that is between a reference axis extending from a center C of the platform 1 (the autonomous traveling vehicle 100) to the front of the platform 1 and an x axis of the movement coordinate system. In addition, in this preferred embodiment, the direction angle $\theta$ increases in a counterclockwise direction in FIG. 4. FIG. 4 is a diagram illustrating a definition of an direction angle of the platform (the autonomous traveling vehicle).

Further, when acquiring the subgoal point P, the time at which the subgoal point P is acquired may be stored in the storage unit 73. In this case, the planned traveling route data includes an aggregate of times at which the subgoal points P are acquired and an aggregate of subgoal points P associated with the times.

The position estimating unit 72 estimates the position and the direction of the platform 1 (the autonomous traveling vehicle 100) in the travel environment (on the movement plane). The position estimating unit 72 is able to estimate the position and the direction of the autonomous traveling vehicle 100 on the movement plane by using a simultaneous localization and mapping (SLAM) method, for example.

In addition, the position estimating unit 72 converts the relative position information of an obstacle, a wall, or the like viewed from the autonomous traveling vehicle 100 acquired by the detector 3 into coordinate values on the movement coordinate system. Further, the position estimating unit 72 generates map information around the autonomous traveling vehicle 100 on the movement plane (referred to as a local map) based on the position information of an obstacle, a wall, or the like detected by the front detector 31 and the rear detector 33 of the detector 3. In addition, the position estimating unit 72 stores the map information on the movement plane (referred to as an environment map) in the storage unit 73. Further, the position estimating unit 72 compares the environment map with the local map (referred to as map matching) so as to estimate the position of the autonomous traveling vehicle 100 on the movement plane and the direction of the autonomous traveling vehicle 100 on the movement plane.

In addition, the position estimating unit 72 estimates the position of the autonomous traveling vehicle 100 also based on rotation speeds of the first motor 23a and the second motor 23b. For this purpose, the output rotation shafts of the first motor 23a and the second motor 23b are respectively provided with devices to measure rotation speeds of the shafts. In this preferred embodiment, encoders 231a and 231b (FIG. 5) are attached to the output rotation shafts of the first motor 23a and the second motor 23b, respectively.

The position estimation based on the rotation speeds of the first motor 23a (the first main wheel 21a) and the second motor 23b (the second main wheel 21b) as described above may be referred to as "position estimation by dead reckoning". When performing the position estimation by dead reckoning, the position estimating unit 72 of this preferred embodiment estimates positions in consideration of the slip of the first main wheel 21a and the second main wheel 21b.

Further, the position estimating unit 72 complements a result of the position estimation by dead reckoning in consideration of the slip of the first main wheel 21a and the second main wheel 21b and a result of the above-mentioned map matching with each other, so as to estimate the position of the autonomous traveling vehicle 100. As a result, the position estimating unit 72 estimates positions and directions more accurately than the position estimation based on only the detection by the detector 3 or rotation speeds detected by the first motor 23a and the second motor 23b.

The storage unit 73 corresponds to a storage device of the microcomputer system (or a portion of a storage area of the storage). The storage unit 73 stores information such as various settings of the autonomous traveling vehicle 100, the planned traveling route data 500a and 500c, and position information of an obstacle, a wall, or the like. In addition, some or all of the functions of the controller 7 is realized by software, the storage unit 73 may store the software.

The curvature calculation unit 74 calculates a curvature radius at a key subgoal point $P_a$ (key curvature radius R) of a route (referred to as a partial planned traveling route) defined by one of subgoal points P (the key subgoal point $P_a$) included in the planned traveling route data 500a and a predetermined number of subgoal points P before and after the key subgoal point $P_a$ in the planned traveling route data 500a. Further, the curvature calculation unit 74 stores the calculated key curvature radius R in the storage unit 73.

In this preferred embodiment, the curvature calculation unit 74 calculates the key curvature radius R of the partial planned traveling route including three points, which are the key subgoal point $P_a$, a first subgoal point $P_f$ as a subgoal point P before the key subgoal point $P_a$ in the traveling direction, and a second subgoal point $P_s$ as a subgoal point after the key subgoal point $P_a$ in the traveling direction.

In this way, because the partial planned traveling route includes the three subgoal points P, which are the key subgoal point $P_a$, the first subgoal point $P_f$, and the second subgoal point $P_s$, the curvature calculation unit 74 calculates the key curvature radius R by a simpler calculation. As a result, the processing speed of the curvature calculation unit 74 is able to be improved.

Here, the curvature calculation unit 74 selects, as the first subgoal point $P_f$ and the second subgoal point $P_s$, subgoal points P that are closest to the key subgoal point $P_a$ among subgoal points P separated from the key subgoal point $P_a$ by more than a predetermined distance. In this way, the curvature calculation unit 74 calculates the key curvature radius R of the partial planned traveling route with reduced influence of a local unevenness of the route generated by a noise included in the planned traveling route data 500a.

If a noise is included in the planned traveling route data, and if the curvature calculation unit 74 calculates the key curvature radius R of the partial planned traveling route including the noise, when a control parameter adjustment unit 757 (described later) adjusts a control parameter value (described later), the control parameter value may be adjusted to a value different from an optimal value to reproduce an original partial planned traveling route. It is because a calculated value of the key curvature radius of the partial planned traveling route including the noise component may be different from the key curvature radius of an originally intended partial planned traveling route.

In this way, because the subgoal points P, which are closest to the key subgoal point among subgoal points P separated from the key subgoal point $P_a$ by more than a predetermined distance, are used as the first subgoal point $P_f$ and the second subgoal point $P_s$, it is possible to calculate the key curvature radius R of the partial planned traveling route with reduced influence of a local unevenness of the route generated by a noise component. As a result, the control parameter value is able to be adjusted more accurately based on the key curvature radius R.

In this preferred embodiment, the curvature calculation unit 74 calculates key curvature radius R, which is a radius r of a circle passing the key subgoal point $P_a$, the first subgoal point $P_f$, and the second subgoal point $P_s$ (a key circle).

The radius r of the key circle is able to be calculated as follows, for example. Specifically, coordinate values of the key subgoal point $P_a$ on the movement coordinate system, coordinate values of the first subgoal point $P_f$, and coordinate values of the second subgoal point $P_s$ are substituted to x and y of the equation of $(x-a)^2+(y-b'^2=)^2=r^2$ expressing a circle passing coordinates (x,y) on the movement coordinate system (where a is an x coordinate value of the center of the key circle, b is a y coordinate value of the center of the key circle, and r is a radius of the key circle), so that three equations having variables a, b and r are generated. By solving these three equations as simultaneous equations, the radius r of the key circle (i.e., the key curvature radius R) is able to be calculated.

Alternatively, an intersection of a perpendicular bisector of a line segment connecting the key subgoal point $P_a$ and the first subgoal point $P_f$ and a perpendicular bisector of a line segment connecting the key subgoal point $P_a$ and the second subgoal point $P_s$ is calculated (this intersection corresponds to the center of the key circle). Then, a distance between the intersection and the key subgoal point is calculated, and hence the radius r of the key circle is able to be calculated.

In this way, the radius r of the key circle passing the three subgoal points, which are the key subgoal point $P_a$, the first subgoal point $P_f$, and the second subgoal point $P_s$, is calculated as the key curvature radius R, and hence the curvature calculation unit 74 calculates the key curvature radius R more easily.

The motor driving unit 75 is electrically connected to the first motor 23a and the second motor 23b. In this way, the motor driving unit 75 controls the first motor 23a and the second motor 23b.

In addition, the motor driving unit 75 is connected to the operation interface 5 in a manner capable of transmitting and receiving signals, and controls the first motor 23a and the second motor 23b based on the rotation amounts and/or the rotation directions of the operation handles 51a and 51b of the operation interface 5 when the teaching travel mode is executed.

On the other hand, when the reproduction travel mode is executed, the motor driving unit 75 generates control commands of the first motor 23a and the second motor 23b based on the planned traveling route data 500c stored in the storage unit 73. Further, the motor driving unit 75 controls the first motor 23a and the second motor 23b based on the generated control commands.

Detailed structure and operation of the motor driving unit 75 will be described later.

The obstacle information acquiring unit 76 is connected to the front detector 31 and the rear detector 33 of the detector 3 in a manner capable of transmitting and receiving signals. The obstacle information acquiring unit 76 acquires position information of an obstacle, a wall, or the like based on signals output from the front detector 3l and the rear detector 33. Further, the obstacle information acquiring unit 76 stores position information of an obstacle, a wall, or the like in the storage unit 73 as necessary. In this case, the obstacle information acquiring unit 76 may output the position information of an obstacle, a wall, or the like to the position estimating unit 72. Further, the position estimating unit 72 may convert the position information of an obstacle, a wall, or the like into coordinate values on the movement coordinate system so as to store the position information of an obstacle, a wall, or the like in the storage unit 73.

The switch 77 switches and sets the travel mode of the autonomous traveling vehicle 100 to one of the reproduction travel mode and the teaching travel mode based on a setting of the travel mode in the mode controller 53 of the operation interface 5. Further, each portion of the controller 7 refers to the travel mode set by the switch 77 as necessary.

Figure 5:
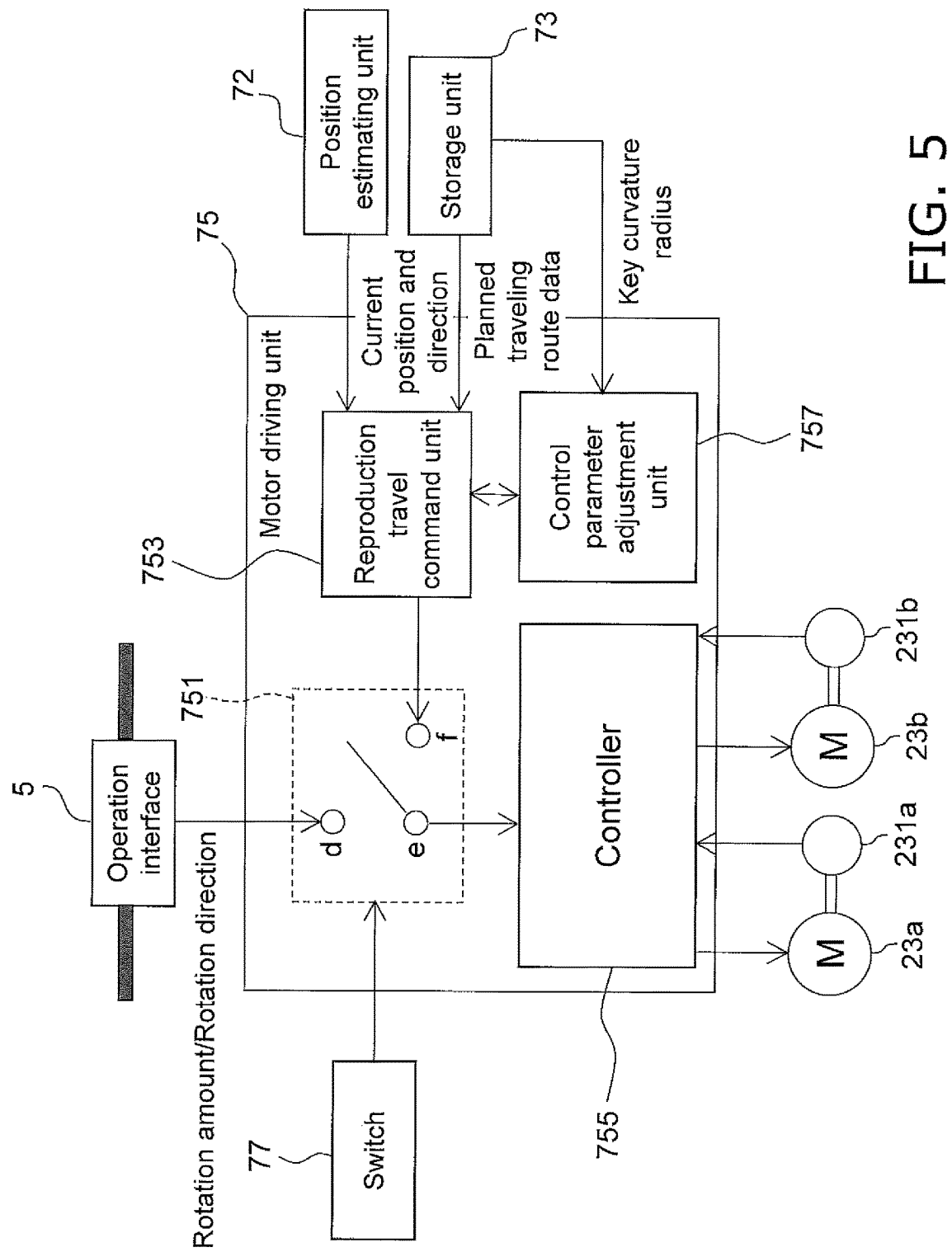
FIG. 5 is a diagram illustrating a structure of a motor driving unit.

Next, a structure of the motor driving unit 75 is described with reference to FIG. 5. FIG. 5 is a diagram illustrating a structure of the motor driving unit 75.

The motor driving unit 75 is connected to the operation interface 5, the storage unit 73, and the switch 77 in a manner capable of transmitting and receiving signals. In addition, the motor driving unit 75 is electrically connected to the first motor 23a and the second motor 23b. Further, the motor driving unit 75 is connected to the encoders 231a and 231b provided respectively to the first motor 23a and the second motor 23b in a manner capable of transmitting and receiving signals.

The motor driving unit 75 is configured or programmed to include a drive switch 751, a reproduction travel command unit 753, a motor controller 755, and a control parameter adjustment unit 757.

The drive switch 751 is connected to the switch 77 in a manner capable of transmitting and receiving signals. In addition, the drive switch 751 includes three terminals d, e and f. When the switch 77 selects the teaching travel mode, the drive switch 751 connects the terminal d and the terminal e. On the other hand, when the switch 77 selects the reproduction travel mode, the drive switch 751 connects the terminal e and the terminal f.

As a result, when the teaching travel mode is executed, the drive switch 751 inputs the rotation amounts and the rotation directions of the operation handles 51a and 51b of the operation interface 5 to the motor controller 755 (described later). On the other hand, when the reproduction travel mode is executed, the drive switch 751 inputs a reproduction travel command (described later) generated by the reproduction travel command unit 753 (described later) to the motor controller 755.

The reproduction travel command unit 753 is connected to the storage unit 73 in a manner capable of transmitting and receiving signals. In addition, the reproduction travel command unit 753 is connected to the terminal f of the drive switch 751.

When the reproduction travel mode is executed, the reproduction travel command unit 753 generates the reproduction travel command for the motor controller 755 (described later) to control the first motor 23a and the second motor 23b based on the planned traveling route data 500c stored in the storage unit 73. Further, when the reproduction travel mode is executed, the reproduction travel command unit 753 outputs the reproduction travel command to the motor controller 755.

The reproduction travel command generated by the reproduction travel command unit 753 is a first main wheel rotation speed $V_a$ (described later) of the first main wheel 21a and a second main wheel rotation speed $V_b$ (described later) of the second main wheel 21b when the autonomous traveling vehicle 100 (the platform 1) moves from the current position to the next target travel point.

Accordingly, the reproduction travel command unit 753 is connected to the position estimating unit 72 in a manner capable of transmitting and receiving signals so as to acquire a current position of the autonomous traveling vehicle 100 from the position estimating unit 72.

In addition, the reproduction travel command unit 753 is connected to the control parameter adjustment unit 757 (described later) in a manner capable of transmitting and receiving signals. Accordingly, the reproduction travel command unit 753 is able to receive the control parameter $K_p$ adjusted based on the key curvature radius R (described later) from the control parameter adjustment unit 757.

Further, the reproduction travel command unit 753 calculates the first main wheel rotation speed $V_a$ and the second main wheel rotation speed $V_b$ based on the received control parameter $K_p$.

In this way, the first main wheel rotation speed $V_a$ and/or the second main wheel rotation speed $V_b$ are calculated based on the key curvature radius R, and hence the reproduction travel command (the first main wheel rotation speed $V_a$ and the second main wheel rotation speed $V_b$) in accordance with a curvature of the partial planned traveling route is able to be calculated.

A method of calculating the reproduction travel command in the reproduction travel command unit 753 will be described later in detail.

The motor controller 755 is electrically connected to the first motor 23a and the second motor 23b. In addition, the motor controller 755 is connected to the encoders 231a and 231b provided respectively to the first motor 23a and the second motor 23b, in a manner capable of transmitting and receiving signals. Further, the motor controller 755 is connected to the terminal e of the drive switch 751.

When the teaching travel mode is executed, the motor controller 755 inputs the rotation amounts and the rotation directions of the operation handles 51a and 51b of the operation interface 5 via the drive switch 751, and controls the first motor 23a and the second motor 23b independently based on the rotation amounts and the rotation directions. On the other hand, when the reproduction travel mode is executed, the motor controller 755 inputs the reproduction travel command generated based on the planned traveling route data 500c via the drive switch 751, and controls the first motor 23a and the second motor 23b based on the reproduction travel command.

In addition, when controlling the first motor 23a and the second motor 23b, the motor controller 755 controls the rotation speeds of the first motor 23a and the second motor 23b based on feedback of an actual rotational frequency of the first motor 23a and an actual rotational frequency of the second motor 23b, so as to follow the rotation speeds based on the reproduction travel command and rotation amounts of the operation handles 51a and 51b (feedback control). Accordingly, as the motor controller 755, it is possible to use a motor control device or the like using a proportional integral differential (PID) control theory, for example.

The control parameter adjustment unit 757 is connected to the storage unit 73 in a manner capable of transmitting and receiving signals. In addition, the control parameter adjustment unit 757 is connected to the reproduction travel command unit 753 in a manner capable of transmitting and receiving signals. Accordingly, when the reproduction travel mode is executed, the control parameter adjustment unit 757 adjusts the control parameter $K_p$ based on the key curvature radius R calculated by the curvature calculation unit 74 and stored in the storage unit 73. Further, the control parameter adjustment unit 757 transmits the determined control parameter $K_p$ to the reproduction travel command unit 753.

A method of determining the control parameter $K_p$ in the control parameter adjustment unit 757 will be described later in detail.

A predetermined control period is able to be selected as a control period $T_c$ of the first motor 23a and the second motor 23b in the motor driving unit 75. For instance, the control period $T_c$ may be the same as a teaching data acquiring time T (described later) that is the time interval at which the subgoal points are acquired when the teaching travel mode is executed. In this case, the first motor 23a and the second motor 23b are controlled every time when reaching the subgoal point (or the vicinity of the subgoal point) in the planned traveling route data.

Alternatively, the motor control period $T_c$ may be shorter than the teaching data acquiring time T. In this case, for example, the motor control period $T_c$ may be 1/c (c is an integer) of the teaching data acquiring time T. In this way, more precise motor control is able to be performed.

Figure 6A:
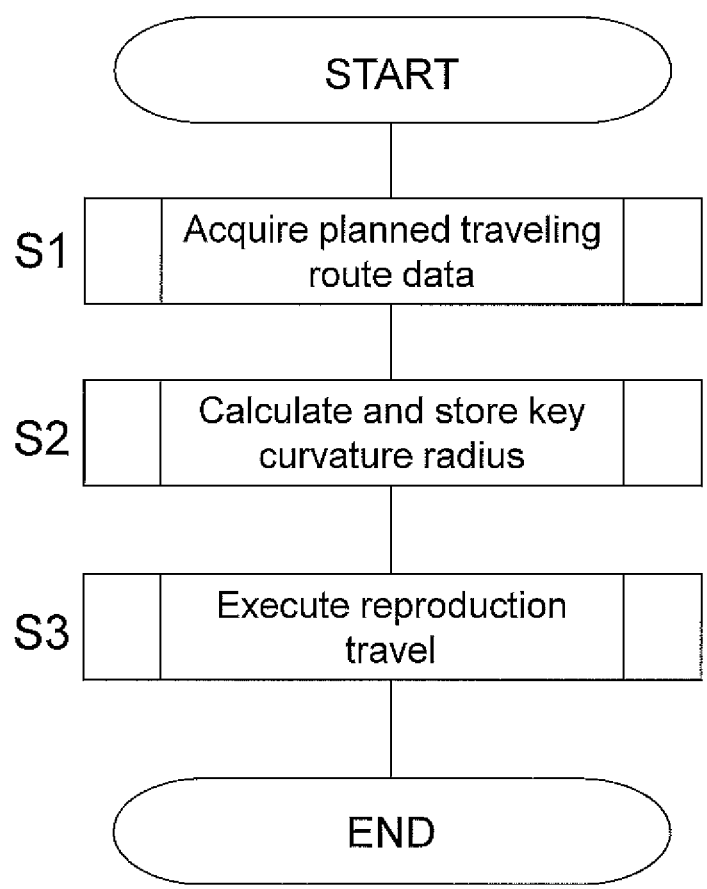
FIG. 6A is a flowchart illustrating a basic operation of the autonomous traveling vehicle.

Next, a basic operation of the autonomous traveling vehicle 100 according to this preferred embodiment is described with reference to FIG. 6A. FIG. 6A is a flowchart illustrating a basic operation of the autonomous traveling vehicle.

In the autonomous traveling vehicle 100, the teaching unit 71 first acquires the planned traveling route data 500a (Step S1). In other words, the teaching unit 71 acquires the subgoal points P, which are points on the movement coordinate system (coordinate values) through which the autonomous traveling vehicle 100 passes when the user operates the autonomous traveling vehicle 100 using the operation interface 5 or the like. In this way, the teaching unit 71 teaches the planned traveling route to the autonomous traveling vehicle 100 based on the operation of the operation interface 5.

After acquiring the planned traveling route data 500a, the curvature calculation unit 74 calculates the key curvature radius R of the partial planned traveling route formed of a predetermined number of (three in this preferred embodiment) subgoal points P from the acquired planned traveling route data 500a (Step S2). Further, the curvature calculation unit 74 stores the calculated key curvature radius R in the storage unit 73. In this case, the calculated key curvature radius R is stored in the storage unit 73 in association with the key subgoal point.

Note that the calculation of the key curvature radius R in Step S2 described above may be performed in a terminal, which is separated from the autonomous traveling vehicle 100 and has the same function as the curvature calculation unit 74, for example, another computer terminal or the like executing a program having the same function as the curvature calculation unit 74.

In this case, for example, after the planned traveling route data 500a is acquired in Step S1, the planned traveling route data 500a is transferred from the storage unit 73 to a storage device (such as a USB memory) capable of connecting to a universal serial bus (USB), for example, and the transferred planned traveling route data 500a is further transferred to another computer terminal or the like described above, so that the another computer terminal calculates the key curvature radius R.

Further, after the key curvature radius R is calculated, the key curvature radius R is associated with the key subgoal point $P_a$, and the planned traveling route data 500c is generated by the another computer terminal. Further, the generated planned traveling route data 500c is transferred from the storage unit of the another computer terminal to the storage unit 73 of the autonomous traveling vehicle 100.

In this way, while operating the autonomous traveling vehicle 100, the calculation of the key curvature radius R is able to be performed simultaneously in the another computer terminal, and hence the autonomous traveling vehicle 100 is able to be operated efficiently.

After the key curvature radius R is calculated, the travel mode of the autonomous traveling vehicle 100 is switched to the reproduction travel mode using the mode controller 53 of the operation interface 5, to cause the autonomous traveling vehicle 100 to perform the reproduction travel along the planned traveling route indicated in the planned traveling route data 500c (Step S3).

Specifically, the reproduction travel command unit 753 of the motor driving unit 75 first generates the reproduction travel command every motor control period. Further, the motor controller 755 controls the first motor 23a and the second motor 23b based on the generated reproduction travel command. These operations are performed until the autonomous traveling vehicle 100 reaches the subgoal point indicated at the last of the planned traveling route data 500c (namely, the travel end position).

When the reproduction travel command unit 753 calculates the reproduction travel command, the reproduction travel command unit 753 receives the control parameter $K_p$ optimized (adjusted) based on the key curvature radius R from the control parameter adjustment unit 757. Further, the reproduction travel command unit 753 calculates the first main wheel rotation speed $V_a$ and/or the second main wheel rotation speed $V_b$ based on the received control parameter $K_p$. In this way, the first main wheel rotation speed $V_a$ and/or the second main wheel rotation speed $V_b$ (namely, the reproduction travel command) that is optimal for the key curvature radius R (curvature) of the partial planned traveling route is calculated. As a result, the autonomous traveling vehicle 100 is able to travel while faithfully reproducing the planned traveling route without deviating from the planned traveling route.

Steps S1 to S3 described above are described below in further detail.

Figure 6B:
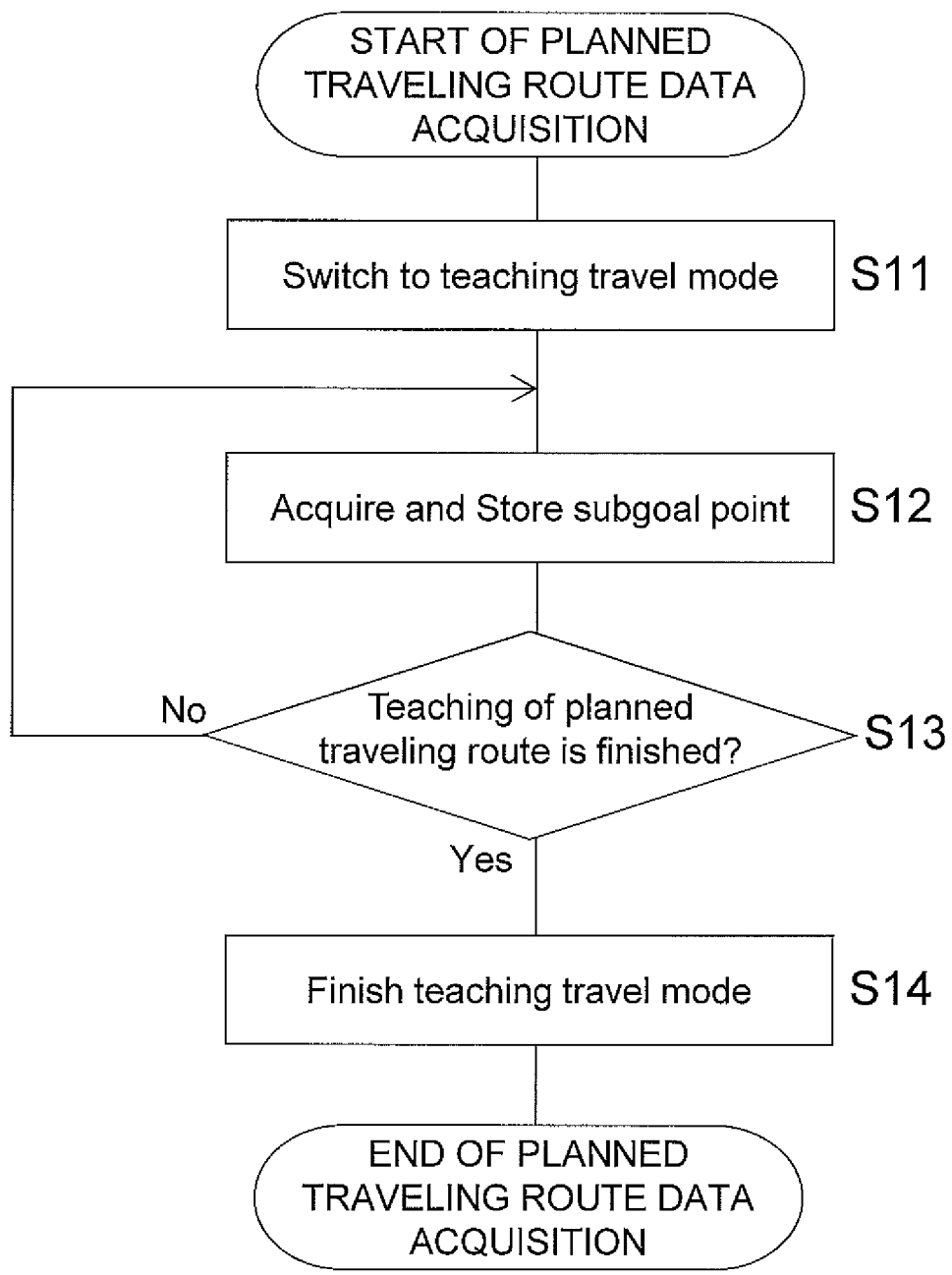
FIG. 6B is a flowchart illustrating a method of acquiring planned traveling route data.

First, a method of acquiring the planned traveling route data 500a in Step S1 of FIG. 6A in the autonomous traveling vehicle 100 according to this preferred embodiment is described with reference to FIG. 6B. FIG. 6B is a flowchart illustrating a method of acquiring the planned traveling route data in the autonomous traveling vehicle.

First, in order to acquire the planned traveling route data 500a, the travel mode of the autonomous traveling vehicle 100 is set to the teaching travel mode (Step S11). For instance, the travel mode is switched to the teaching travel mode when the user operates the mode controller 53 of the operation interface 5.

When the travel mode is switched to the teaching travel mode by the mode controller 53, the switch 77 of the controller 7 is informed that the travel mode has switched to the teaching travel mode. Then, the switch 77 instructs the drive switch 751 of the motor driving unit 75 to connect the terminal d and the terminal e of the drive switch 751. In this way, the signal based on the rotation amounts and the rotation directions of the operation handles 51a and 51b of the operation interface 5 is able to be input to the motor controller 755. In this way, the user is able to manually operate the autonomous traveling vehicle 100 by adjusting the rotation amounts and the rotation directions of the operation handles 51a and 51b.

At the timing when the travel mode is set to the teaching travel mode, the teaching unit 71 starts a timer (not shown) to measure the teaching data acquiring time. The function of this timer is realized by using a clock function or a clock generator provided to the computer or the like constituting the controller 7.

After setting the travel mode to the teaching travel mode, the user manually operates the autonomous traveling vehicle 100. During the manual operation of the user, the teaching unit 71 acquires the subgoal point P and stores the same in the storage unit 73 every predetermined teaching data acquiring time (Step S12). When acquiring the subgoal point P, the teaching unit 71 instructs the position estimating unit 72 to estimate a current position of the autonomous traveling vehicle 100 on the movement coordinate system (coordinates of the subgoal point P). Then, the position estimating unit 72 responds to the instruction and outputs the position (the subgoal point P) expressed by the coordinate values to the teaching unit 71. Further, the teaching unit 71 stores the output subgoal point P in the storage unit 73.

When storing the subgoal point P in the storage unit 73, if the subgoal point P is already stored in the storage unit 73, the teaching unit 71 adds the newly acquired subgoal point P at the end of the stored subgoal point P. In this way, an aggregate of subgoal points P, namely the planned traveling route data 500a is stored in the storage unit 73.

In addition, in this preferred embodiment, when acquiring the subgoal point P, the teaching unit 71 acquires information of a direction of the autonomous traveling vehicle 100 (the platform 1) at the subgoal point P. The information of a direction of the autonomous traveling vehicle 100 is able to be acquired when the position estimating unit 72 performs map matching between the environment map and the local map. In this way, as described later, the first main wheel rotation speed $V_a$ and the second main wheel rotation speed $V_b$ is able to be calculated by using the information of a direction.

Figure 7A:
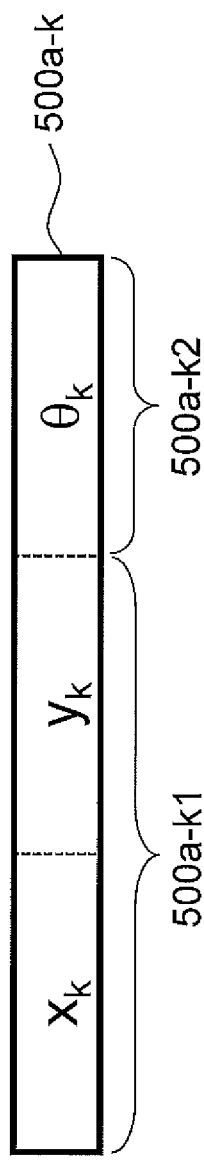
FIG. 7A is a diagram illustrating a data structure of a planned traveling route data unit acquired in a k-th order.

When performing Step S12 described above, the data as illustrated in FIG. 7A is acquired. FIG. 7A is a diagram illustrating a data structure of a planned traveling route data unit 500a-k acquired at the k-th acquisition of the planned travel route data unit. Here, the planned traveling route data unit is a smallest unit that defines the planned traveling route data.

The planned traveling route data unit 500a-k contains a subgoal point coordinate storage area 500a-k1 to store an x coordinate value $x_k$ of a subgoal point $P_k$ acquired at the k-th acquisition and a y coordinate value $y_k$ of the subgoal point $P_k$ acquired at the k-th acquisition, and an direction information storage area 500a-k2 to store the information $\theta_k$ about an direction of the autonomous traveling vehicle 100 at the subgoal point coordinate values ($x_k,y_k$) stored in the subgoal point coordinate storage area 500a-k1 (referred to as an direction angle). In this way, as a unit of the planned traveling route data 500a, data in which position information of the autonomous traveling vehicle 100 (the platform 1) and the direction information of the autonomous traveling vehicle 100 are associated with each other is obtained.

In addition, when acquiring the subgoal point $P_k$, it is possible to acquire the time at which the subgoal point $P_k$ is acquired (namely, the time expressed as an integral multiplication of the teaching data acquiring time). Here, when the teaching data acquiring time is represented by T, the time at which the subgoal point $P_k$ is acquired in a k-th order is expressed as kT.

Figure 7B:
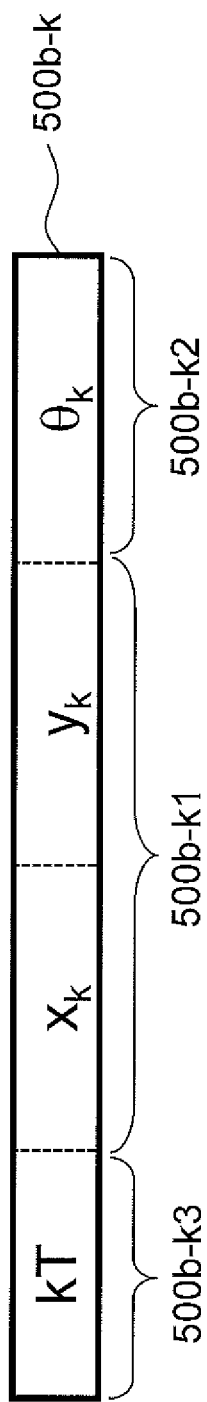
FIG. 7B is a diagram illustrating a data structure of the planned traveling route data unit including a data acquiring time storage area.

In this case, as illustrated in FIG. 7B, a planned traveling route data unit 500b-k further includes, in addition to a subgoal point coordinate storage area 500b-k1 and an direction information storage area 500b-k2, a data acquiring time storage area 500b-k3 to store the teaching data acquiring time. In this way, it is possible to store information of time when the subgoal point P is acquired, as an elapsed time from start of the teaching travel mode (namely, from start of the travel from the travel start position). FIG. 7B is a diagram illustrating a data structure of the planned traveling route data unit including the data acquiring time storage area.

After acquiring the subgoal point $P_k$, the teaching unit 71 checks whether or not the teaching of the planned traveling route by manual operation of the user has finished before acquisition of a next subgoal point $P_{k+1}$ (Step S13). Here, as to the determination whether or not the teaching of the planned traveling route has finished, for example, it is possible to provide the operation interface 5 with a switch (not shown) to notify the teaching unit 71 that the teaching of the planned traveling route is finished, so that the user operates the switch so as to notify that the teaching of the planned traveling route is finished.

Alternatively, when detecting that the rotation amounts of the operation handles 51a and 51b are zero (i.e., they are not operated) for a predetermined period, the teaching unit 71 may determine that the teaching of the planned traveling route is finished.

Other than that, it is possible to determine whether or not the teaching of the planned traveling route is finished by other elements that detect that the user has finished operation of the autonomous traveling vehicle 100.

If it is determined that the teaching of the planned traveling route by manual operation of the user is finished ("Yes" in Step S13), the teaching unit 71 stops execution of the teaching travel mode (Step S14) and finishes acquisition of the planned traveling route data 500a.

On the other hand, if it is determined that the teaching of the planned traveling route by manual operation of the user continues ("No" in Step S13), the process returns to Step S12 in which acquisition and storing of the subgoal point P are continued. In this way, the teaching unit 71 is able to continue the acquisition and storing of the subgoal point P as long as the teaching of the planned traveling route is continued. In other words, the teaching unit 71 is able to acquire the planned traveling route when traveling from the travel start position to the travel end position as an aggregate of subgoal points P (the planned traveling route data units 500a-k and 500b-k).

In this preferred embodiment, the planned traveling route data 500a illustrated in FIG. 7C is acquired by the procedure of the flowchart illustrated in FIG. 6B as described above. As illustrated in FIG. 7C, the planned traveling route data 500a is an aggregate of the planned traveling route data units 500a-k (k=0, 1, 2, . . . , n (n is an integer)). FIG. 7C is a diagram illustrating a data structure of the planned traveling route data. As a result, the planned traveling route data 500a includes a subgoal point coordinate value aggregate storage area $G_s$ to store the aggregate of subgoal points $P_k$ and an direction information aggregate storage area $G_\theta$ to store the aggregate of direction angles $\theta_k$.

The planned traveling route data 500a illustrated in FIG. 7C forms the aggregate of the planned traveling route data units 500a-k piled (stacked) in the up and down direction on the paper plane. However, an arrangement of the planned traveling route data units 500a-k in the planned traveling route data 500a is not limited to the stack in the up and down direction.

For instance, it is possible to adopt an arrangement in which the end of the planned traveling route data unit 500a-k included in the planned traveling route data 500a (namely, the end of the direction information storage area 500a-k2 in the planned traveling route data unit 500*a*-*k* of FIG. 7A) is linked to the head of the next planned traveling route data unit 500*a*-*k*+1 (namely, the start position of the planned traveling route data unit 500*a*-*k*+1 of FIG. 7A).

Other than that, as the arrangement of the planned traveling route data units 500*a*-*k* in the planned traveling route data 500*a*, it is possible to select an appropriate arrangement in accordance with an electronic file format or the like that is able to be used in the microcomputer system constituting the controller 7.

Figure 6C:
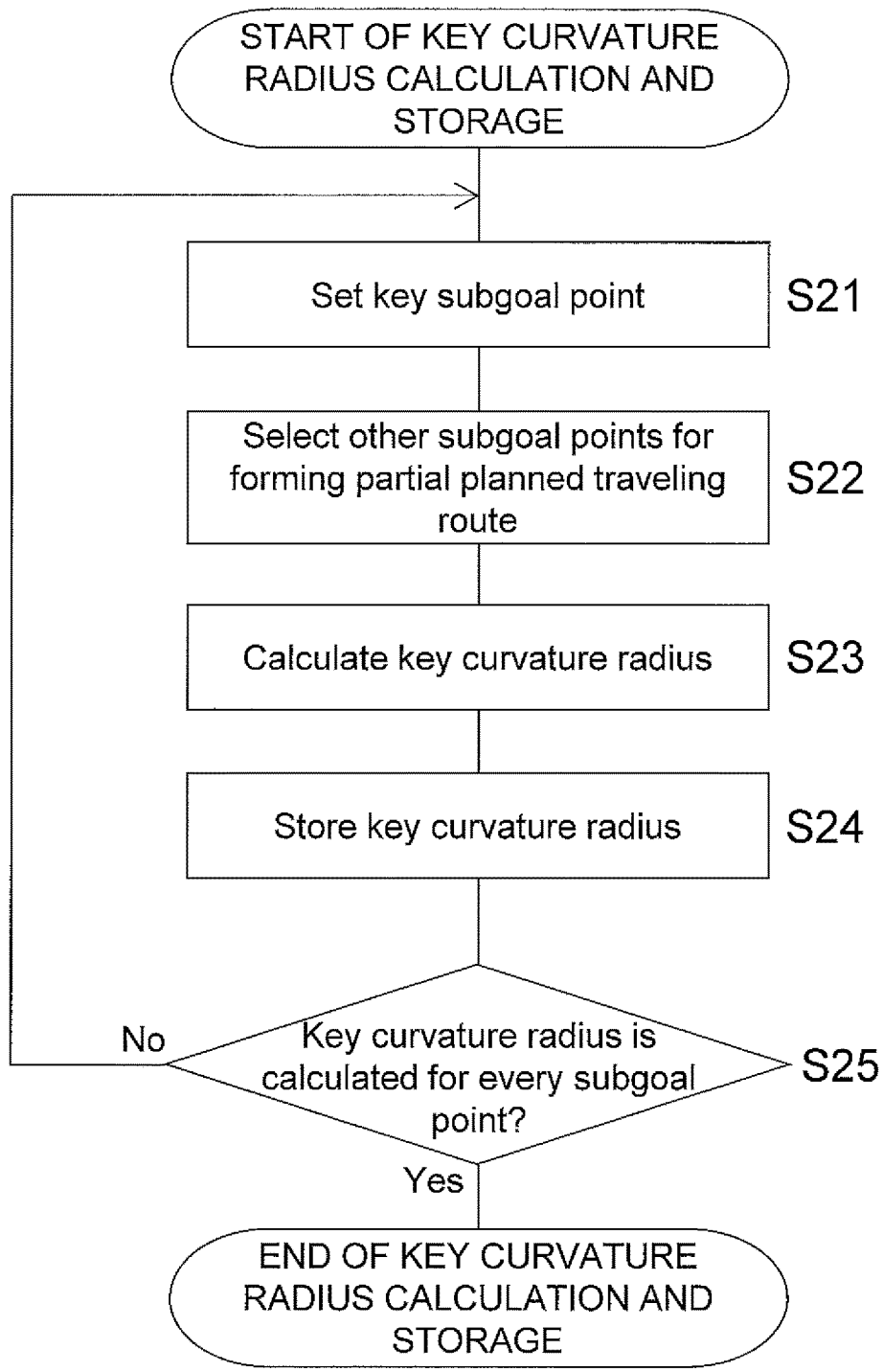
FIG. 6C is a flowchart illustrating a method of calculating and storing a key curvature radius.

Next, a method of calculating and storing the key curvature radius R in Step S2 of FIG. 6A is described with reference to FIG. 6C. FIG. 6C is a flowchart illustrating a method of calculating and storing the key curvature radius. Here, a method of calculating the key curvature radius R using the planned traveling route data 500*a* is described.

First, the curvature calculation unit 74 selects one of the planned traveling route data units 500*a*-*k* in the planned traveling route data 500*a* stored in the storage unit 73 and sets the coordinate values $(x_k, y_k)$ of the subgoal point $P_k$ stored in the subgoal point coordinate storage area 500*a*-*k*1 of the planned traveling route data unit 500*a*-*k* as the key subgoal point (Step S21).

It is supposed that a subgoal point $P_m(x_m, y_m)$ included in an m-th planned traveling route data unit 500*a*-*m* is set as a key subgoal point $P_{am}$.

Next, the curvature calculation unit 74 selects other subgoal points P of the partial planned traveling route together with the key subgoal point $P_{am}$ (Step S22).

In this preferred embodiment, the key curvature radius R of the partial planned traveling route including three subgoal points P including the key subgoal point $P_{am}$ is calculated (described later). Accordingly, in this preferred embodiment, the curvature calculation unit 74 selects other two subgoal points (the first subgoal point $P_f$ and the second subgoal point $P_s$). In this preferred embodiment, subgoal points that are closest to the key subgoal point $P_{am}$ among the subgoal points P separated from the key subgoal point $P_{am}$ by more than a predetermined distance are selected as the first subgoal point $P_f$ and the second subgoal point $P_s$. Specifically, the curvature calculation unit 74 selects the first subgoal point $P_f$ and the second subgoal point $P_s$ as follows.

First, the curvature calculation unit 74 selects a subgoal point $P_{m+u}(x_{m+u}, y_{m+u})$ included in a planned traveling route data unit 500*a*-*m*+*u* (u is a positive integer) as the first subgoal point $P_f$. The curvature calculation unit 74 selects a subgoal point $P_{m-v}(x_{m-v}, y_{m-v})$ included in a planned traveling route data unit 500*a*-*m*-*v* (v is a positive integer) as the second subgoal point $P_s$.

Here, the subgoal point $P_{m+u}$ included in the planned traveling route data unit 500*a*-*m*+*u* is selected as the first subgoal point $P_f$ because the first subgoal point $P_f$ is a subgoal point before the key subgoal point $P_{am}$ in the traveling direction.

On the other hand, the subgoal point $P_{m-v}$ included in the planned traveling route data unit 500*a*-*m*-*v* is selected as the second subgoal point $P_s$ because the second subgoal point $P_s$ is a subgoal point after the key subgoal point $P_{am}$ in the traveling direction.

Next, the curvature calculation unit 74 calculates a distance between the key subgoal point $P_{am}$ and a first subgoal point $P_{f(m+u)}$. Further, the curvature calculation unit 74 determines whether or not the distance is a predetermined distance or larger. In this case, the curvature calculation unit 74 increments u one by one from one, calculates the distance between the key subgoal point $P_{am}$ and the first subgoal point $P_{f(m+u)}$ for each value of u, and determines whether or not the distance is the predetermined distance or larger one by one. In this way, the curvature calculation unit 74 detects a minimum value H (H is a positive integer) of u when the distance between the key subgoal point $P_{am}$ and the first subgoal point $P_{f(m+u)}$ becomes the predetermined distance or larger.

In this way, the curvature calculation unit 74 selects a subgoal point $P_{m+H}(x_{m+m}, y_{m+H})$ as the first subgoal point $P_{f(m+H)}$.

Next, the curvature calculation unit 74 calculates a distance between the key subgoal point $P_{am}$ and a second subgoal point $P_{s(m-v)}$. Further, the curvature calculation unit 74 determines whether or not the distance is a predetermined distance or larger. In this case, the curvature calculation unit 74 increments v one by one from one, calculates the distance between the key subgoal point $P_{am}$ and the second subgoal point $P_{s(m-v)}$ for each value of v, and determines whether or not the distance is the predetermined distance or larger one by one. In this way, the curvature calculation unit 74 detects a minimum value I (I is a positive integer) of v when the distance between the key subgoal point $P_{am}$ and the second subgoal point $P_{s(m-v)}$ becomes the predetermined distance or larger.

In this way, the curvature calculation unit 74 selects a subgoal point $P_{m-I}(x_{m-I}, y_{m-I})$ as the second subgoal point $P_{s(m-I)}$.

Further, when the first subgoal point $P_f$ and the second subgoal point $P_s$ are selected as described above, depending on a value of m (in particular, if the key subgoal point $P_{am}$ is close to the travel start position or the travel end position), m−v may be a negative value or m+u may be larger than n (n is the number of the planned traveling route data units included in the planned traveling route data 500*a* (namely, the number of the subgoal points)).

If m+u is larger than the number n of the subgoal points or if m−v is a negative value, the curvature calculation unit 74 regards the partial planned traveling route as a straight line (namely, regards that the key curvature radius is infinity).

In this way, by selecting the subgoal points having more than a predetermined distance from the key subgoal point $P_{am}$ as the first subgoal point $P_{f(m+u)}$ and the second subgoal point $P_{s(m-v)}$, the curvature calculation unit 74 calculates the key curvature radius of an intended planned traveling route while reducing an influence of a local unevenness of the route generated by a noise component included in the planned traveling route data.

After selecting the first subgoal point $P_f$ and the second subgoal point $P_s$, the curvature calculation unit 74 calculates a key curvature radius $R_m$ of the partial planned traveling route including the key subgoal point $P_{am}$, the first subgoal point $P_{f(m+H)}$, and the second subgoal point $P_{s(m-I)}$ (Step S23).

Specifically, the curvature calculation unit 74 calculates a radius $r_m$ of a circle (the key circle) passing the three subgoal points, which are the key subgoal point $P_{am}$, the first subgoal point $P_{f(m+H)}$, and the second subgoal point $P_{s\ (m-1)}$, as the key curvature radius $R_m$.

For calculating the radius $r_m$ of the key circle, it is possible to adopt the method of solving simultaneous equations including three equations expressing circles on the movement coordinate system as described above, or the method of calculating a distance between the key subgoal point $P_{am}$ and an intersection of a perpendicular bisector of a line segment connecting the key subgoal point $P_{am}$ and the first subgoal point $P_{f(m+H)}$ and a perpendicular bisector of a line segment connecting the key subgoal point $P_{am}$ and the second subgoal point $P_{s(m-I)}$.

After calculating the key curvature radius $R_m$, the curvature calculation unit 74 stores the calculated radius $r_m$ of the key circle (i.e., the key curvature radius $R_m$) in the storage unit 73 (Step S24). In this case, the key curvature radius $R_m$ is stored in the storage unit 73 in association with the key subgoal point $P_{am}$.

Figure 7D:
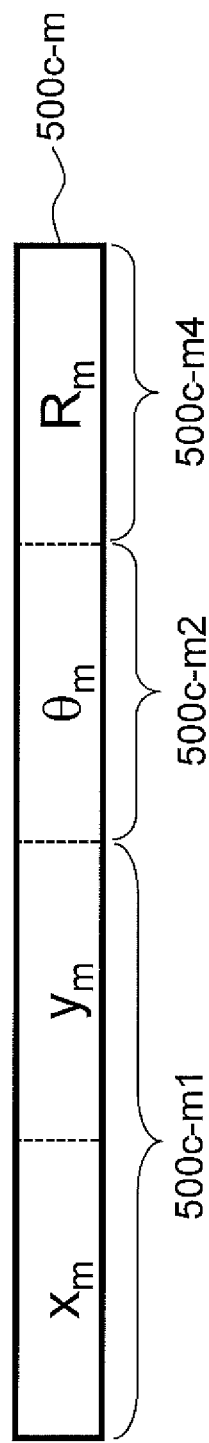
FIG. 7D is a diagram illustrating of a data structure of the planned traveling route data unit storing the key curvature radius.

Specifically, the curvature calculation unit 74 adds the calculated key curvature radius $R_m$ (i.e., the radius $r_m$ of the key circle) to the planned traveling route data unit 500a-m including the key subgoal point $P_{am}$, so as to generate a new planned traveling route data unit 500c-m (FIG. 7D). Further, the curvature calculation unit 74 stores the planned traveling route data unit 500c-m in the storage unit 73.

As a result, the new planned traveling route data unit 500c-m becomes the planned traveling route data unit having the data structure as illustrated in FIG. 7D. FIG. 7D is a diagram illustrating a data structure of the new planned traveling route data unit (that stores the key curvature radius). In other words, the planned traveling route data unit 500c-m has the data structure including a key curvature radius storage area 500c-m4 in addition to a subgoal point coordinate storage area 500c-m1 and an direction information storage area 500c-m2.

After storing the key curvature radius $R_m$ in association with the key subgoal point $P_{am}$, the curvature calculation unit 74 checks whether or not the key curvature radius R is calculated for all the subgoal points P ($P_0$, $P_1$, $P_2$, ... $P_n$) (Step S25).

If the key curvature radius R is not calculated for all the subgoal points ("No" in Step S25), the curvature calculation unit 74 increments k from m to m+1, and the process returns to Step S21. Further, Steps S21 to S24 are executed again. In this way, a key curvature radius $R_{m+1}$ at a next key subgoal point $P_{a(m+I)}$ is calculated and stored in the storage unit 73.

On the other hand, if it is determined that the key curvature radius R is calculated for all the subgoal points P ("Yes" in Step S25), namely, if k is n, the curvature calculation unit 74 finishes the calculation and storing of the key curvature radius.

Figure 7E:
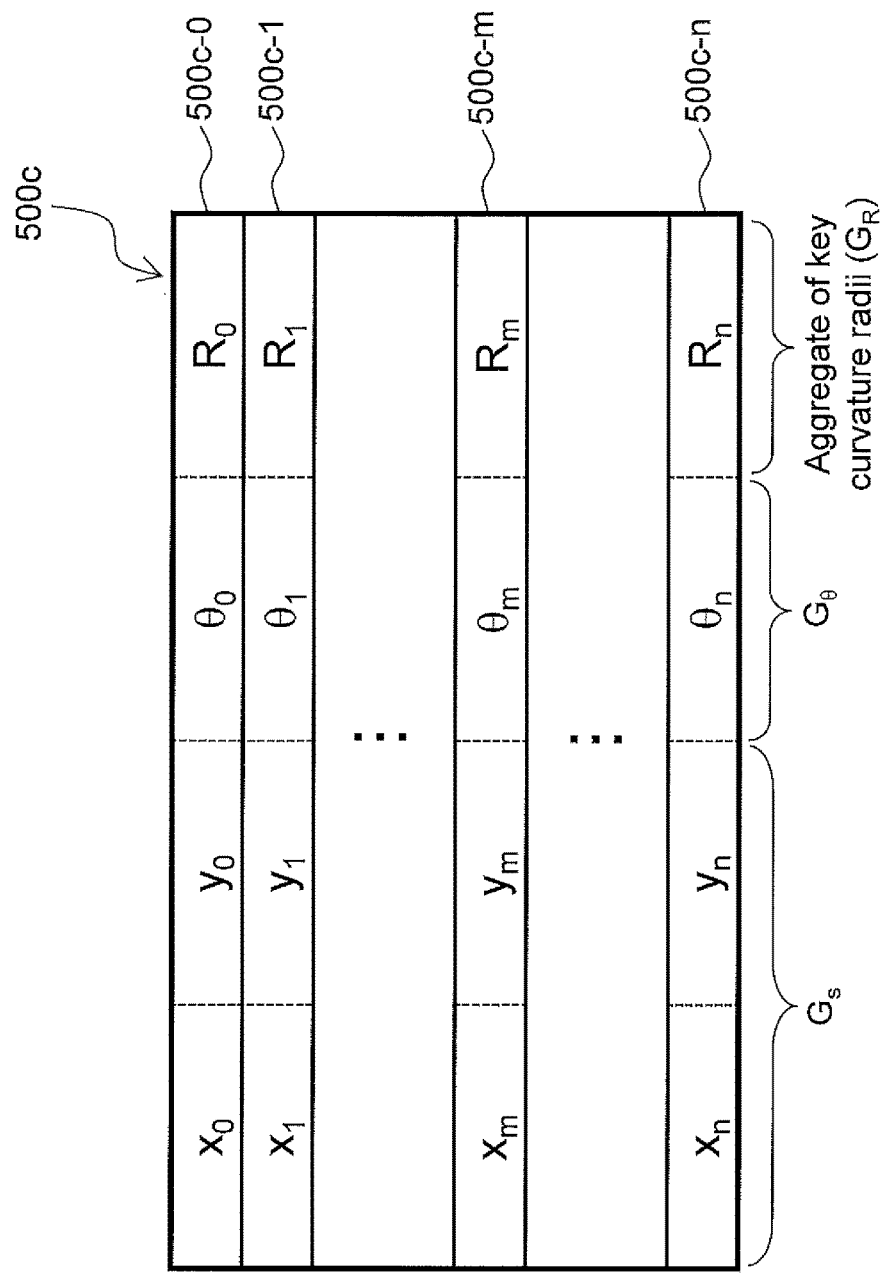
FIG. 7E is a diagram illustrating a data structure of the planned traveling route data containing an aggregate of the key curvature radii.

Note that when Steps S21 to S25 are executed first after Step S1, k is set to zero. Accordingly, by executing Steps S21 to S25 illustrated in FIG. 6C, k is increased from 0 to n, and radii $r_0$, $r_1$, $r_2$, ... $r_n$ of the key circles at the subgoal points (key curvature radii $R_0$, $R_1$, $R_2$, ... $R_n$) are calculated and stored in the storage unit 73. As a result, the curvature calculation unit 74 generates the new planned traveling route data 500c (FIG. 7E) including an aggregate of key curvature radii R, which is an aggregate of planned traveling route data units 500c-k (k=1, 2, ..., m, ..., n (n is an integer)). FIG. 7E is a diagram illustrating a data structure of the planned traveling route data further including an aggregate of key curvature radii. The planned traveling route data 500c further includes a key curvature radius aggregate storage area $G_R$ to store the aggregate of key curvature radii R in addition to the subgoal point coordinate value aggregate storage area $G_s$ and the direction information aggregate storage area $G_\theta$.

Next, there is described an operation when the autonomous traveling vehicle 100 performs the autonomous travel in Step S3 of the flowchart illustrated in FIG. 6A based on the planned traveling route data 500c generated in the above-mentioned steps.

First, there is described a travel principle of the autonomous traveling vehicle 100 with the opposed two-wheel differential type traveling unit 2, which is necessary for describing the operation of the autonomous traveling vehicle 100 when the reproduction travel mode is executed.

Here, there is described the travel principle of the autonomous traveling vehicle 100 (the platform 1) with the opposed two-wheel differential type traveling unit 2 as illustrated in FIG. 1.

Figure 8:
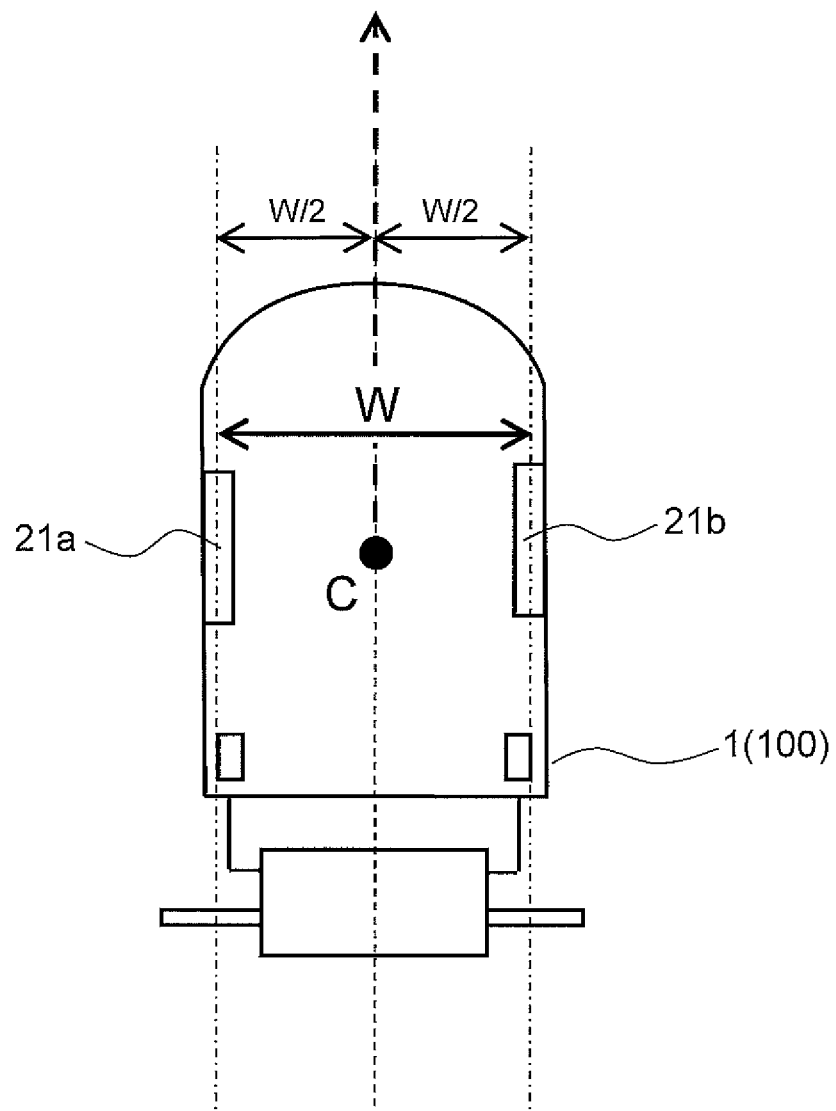
FIG. 8 is a diagram illustrating a definition of a vehicle width of the autonomous traveling vehicle.

As illustrated in FIG. 8, W represents a vehicle width of the autonomous traveling vehicle 100 (defined as a distance between a center of the first main wheel 21a in an axis direction toward the front and a center of the second main wheel 21b of the traveling unit 2 in the axis direction toward the front). In this case, a distance between the center C of the autonomous traveling vehicle 100 and the center of the first main wheel 21a and a distance between the center C of the autonomous traveling vehicle 100 and the center of the second main wheel 21b are W/2 (a half of the vehicle width) respectively. FIG. 8 is a diagram illustrating a definition of the vehicle width of the autonomous traveling vehicle.

Figure 9:
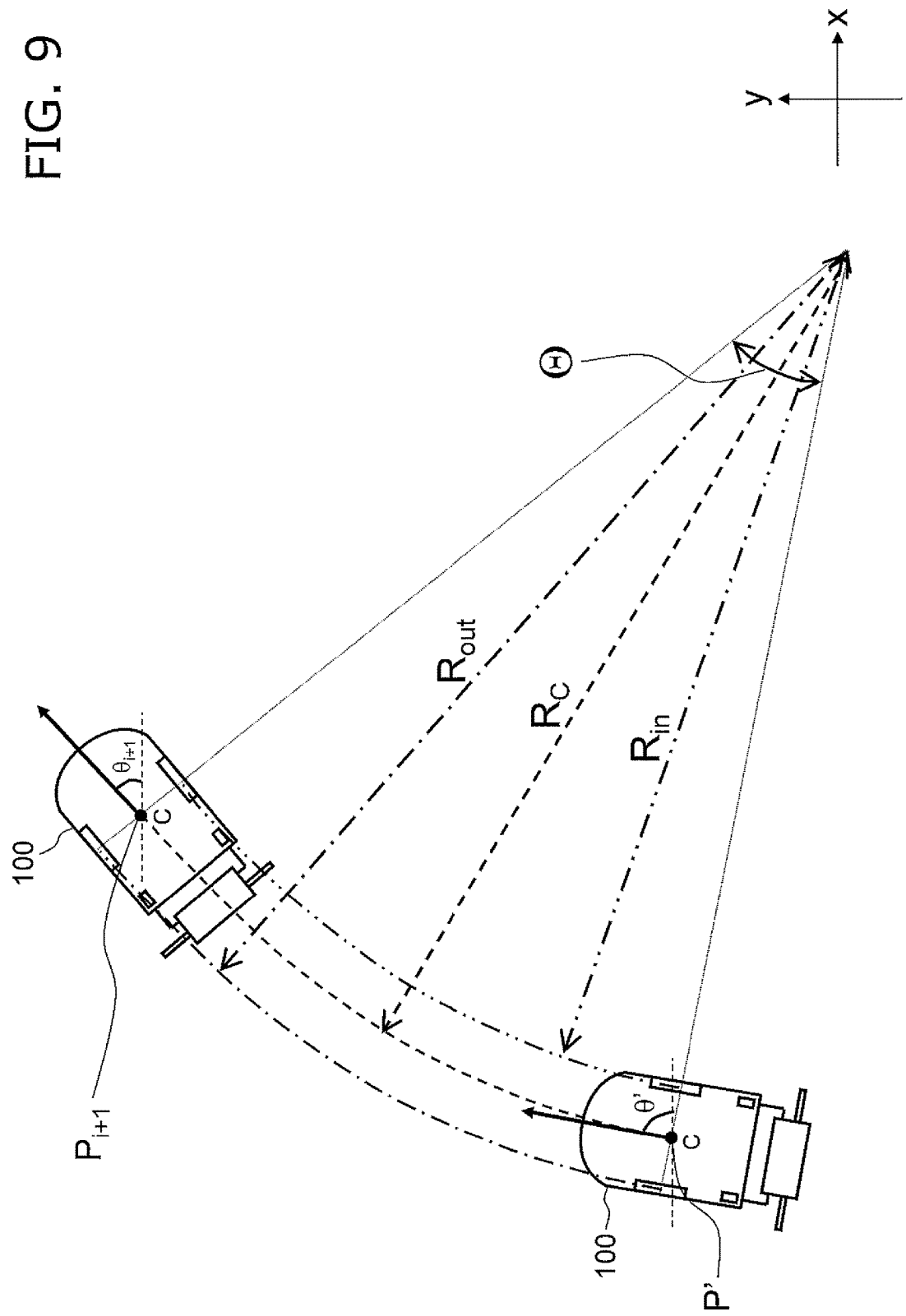
FIG. 9 is a diagram illustrating an example of a traveling route along which the autonomous traveling vehicle travels.

Next, it is supposed that the autonomous traveling vehicle 100 turns right along the traveling route illustrated in FIG. 9 during the control period $T_c$. In other words, it is supposed that the center C of the autonomous traveling vehicle 100 moves along the traveling route having the center curvature radius $R_C$ from a current position P' to a next target travel point $P_{i+1}$ by a turning angle $\Theta$ during the control period $T_c$.

In addition, a radius of curvature of a locus of an outside main wheel (the first main wheel 21a in a case of FIG. 9) is denoted by $R_{out}$, and a radius of curvature of a locus of an inside main wheel (the second main wheel 21b in a case of FIG. 9) is denoted by $R_{in}$. FIG. 9 is a diagram illustrating an example of a traveling route of the autonomous traveling vehicle 100.

In this case, a length of a locus of the center C of the autonomous traveling vehicle 100 (the locus illustrated by a broken line in FIG. 9) is $R_C \times \Theta$, a length of the locus of the outside main wheel in the traveling route (the locus illustrated by a dot dashed line) is $R_{out} \times \Theta$, and a length of the locus of the inside main wheel (the locus illustrated by a double-dot dashed line) is $R_{in} \times \Theta$ ($\Theta$ is a radian angle, and hereinafter angles are radian angles). Further, based on the definition of the vehicle width illustrated in FIG. 8, $R_{out}$ is $R_C + W/2$, and $R_{in}$ is $R_C - W/2$.

Accordingly, when the autonomous traveling vehicle 100 travels along the right turning traveling route illustrated in FIG. 9, a center speed $V_C$ of the center C, an outside main wheel rotation speed $V_{out}$, and an inside main wheel rotation speed $V_{in}$ are expressed as follows.

$$V_C = R_C \times \Theta / T_c$$

$$V_{out} = R_{out} \times \Theta / T_c = (R_C + W/2) \times \Theta / T_c = V_C + W/2 \times \Theta / T_c$$

$$V_{in} = R_{in} \times \Theta / T_c = (R_C - W/2) \times \Theta / T_c = V_C - W/2 \times \Theta / T_c$$

In addition, $V_{out}$ and $V_{in}$ expressed by the above equations are also expressed as follows.

$$V_{out} = V_1 + V_2$$

$$V_{in} = V_1 - V_2$$

Here, $V_1 = V_C$, and $V_2 = W/2 \times \Theta / T_c$. In this way, the main wheel rotation speeds $V_{out}$ and $V_{in}$ are respectively expressed by a sum and a difference of $V_1$ and $V_2$. Here, $V_1$ and $V_2$ are respectively defined as a first rotation speed $V_1$ and a second rotation speed $V_2$.

As understood from the above equations, the autonomous traveling vehicle 100 including the opposed two-wheel differential type traveling unit 2 is able to travel along a curved traveling route by setting the outside main wheel rotation speed $V_{out}$ to be higher than the first rotation speed $V_1$ (namely, the center speed $V_C$) by the second rotation speed $V_2$, and setting the inside main wheel rotation speed $V_{in}$ smaller than the first rotation speed $V_1$ by the second rotation speed $V_2$.

Accordingly, the first rotation speed $V_1$ is able to be defined as a traveling speed component to determine the traveling speed of the autonomous traveling vehicle 100 (center C), and the second rotation speed $V_2$ is able to be defined as a turning component to determine a rotation difference between the inside wheel and the outside wheel of the autonomous traveling vehicle 100 so as to determine a turning movement of the autonomous traveling vehicle 100. In other words, the second rotation speed $V_2$ is a speed component to control a direction of the autonomous traveling vehicle 100.

Here, the second rotation speed $V_2$ expressed by the above theoretical equation is a function of only the turning angle $\Theta$. Accordingly, when the rotation speeds of the main wheels are controlled based on the second rotation speed $V_2$ calculated using the above theoretical equation, the autonomous traveling vehicle 100 may reach a position deviated from the original next target travel point Pill, and/or the direction of the autonomous traveling vehicle 100 at the next target travel point Pill may differ from the original direction. As a result, the autonomous traveling vehicle 100 may not able to faithfully reproduce the planned traveling route indicated in the planned traveling route data 500c.

Accordingly, in this preferred embodiment, the second rotation speed $V_2$ to control the direction of the autonomous traveling vehicle 100 is calculated as the product of the turning angle $\Theta$ and the control parameter $K_p$ adjusted based on the key curvature radius R (namely, a shape of the planned traveling route) using the following equation.

$$V_2 = K_p \times V_d \times \Theta$$

Here, $V_d$ is a constant. In the above equation, the control parameter $K_p$ is adjusted based on the key curvature radius R, and hence the second rotation speed $V_2$ is able to be calculated as an optimal rotation speed based on the key curvature radius R (the shape of the planned traveling route), even if the turning angle $\Theta$ is the same. As a result, a deviation of the direction of the autonomous traveling vehicle 100 at each target travel point (subgoal point) is able to be reduced.

In addition, the turning angle $\Theta$ in the above equation is calculated as $\Theta = \theta_{i+1} - \theta'$ using a direction angle $\theta_{i+1}$ at the next target travel point $P_{i+1}$ and an actual direction angle $\theta_{i+1}$ at the current position P'. In other words, the turning angle $\Theta$ is calculated as a difference between the actual direction angle $\theta$ at the current position and the direction angle $\theta_{i+1}$ at the next target travel point $P_{i+1}$. The difference between the direction angle at the current position and the direction angle at the next target travel point is referred to as a "direction angle difference". Further, as described later, when the reproduction travel mode is executed, the actual direction angle $\theta'$ at the current position P' is estimated by the position estimating unit 72. In addition, the direction angle $\theta'$ at the next target travel point $P_{i+1}$ is read out from the planned traveling route data 500c.

In this way, even if a slip occurs between the main wheel of the autonomous traveling vehicle 100 and the traveling surface on which the autonomous traveling vehicle 100 is traveling so that the actual direction angle $\theta'$ at the current position P' is deviated from an original direction angle, the deviation of the direction angle is able to be reduced at the next target travel point $P_{i+1}$.

Further, because the second rotation speed $V_2$ is the product of the control parameter $K_p$ adjusted based on the key curvature radius R and the direction angle difference $\Theta = \theta_{i+1} - \theta$, even if the direction angle $\theta'$ at the current position P' is deviated from the original direction angle, the deviation of the direction angle $\theta_{i+1}$ is able to be reduced at the next target travel point P' without excessive control of the direction of the autonomous traveling vehicle 100 or insufficient control amount of the direction.

Further, the first rotation speed $V_1$ may be calculated using the above theoretical equation $V_C = R_C \times \Theta / T_c$ based on coordinate values of the current position P', coordinate values of the next target travel point $P_{i+1}$, and the direction angle difference $\Theta$ (i.e., $\theta_{i+1} - \theta'$), or may be set to a constant value. The case where the first rotation speed $V_1$ is able to be a constant value is considered to be, for example, a case where there is little influence of slip between the main wheel and the traveling surface, or a case where a position deviation due to a slip is hardly generated because the motor control period $T_c$ is short or other reason.

It is possible to determine which one of the above methods should be selected in consideration of a calculation load of the reproduction travel command unit 753 and the like.

Figure 6D:
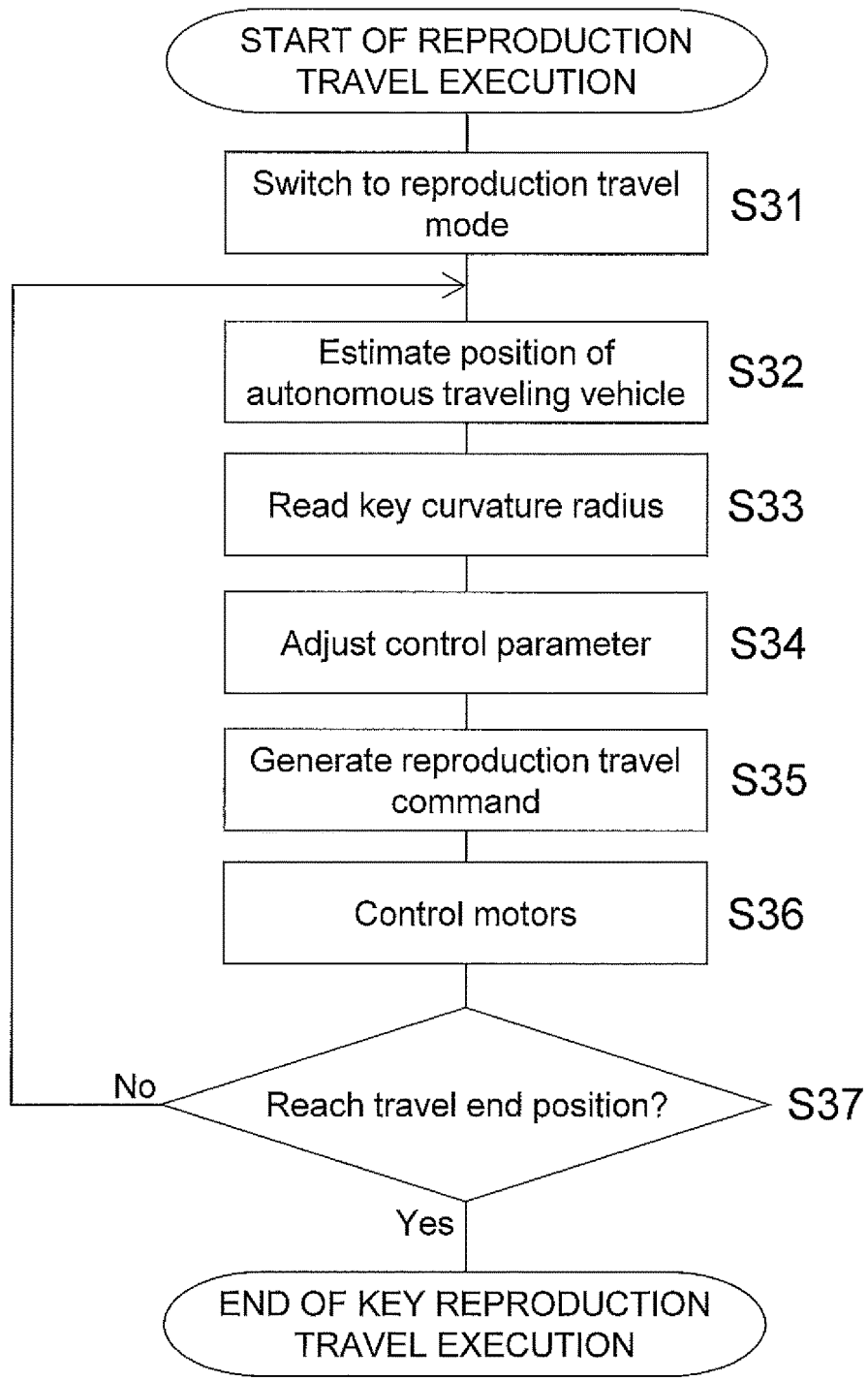
FIG. 6D is a flowchart illustrating an operation of the autonomous traveling vehicle when the reproduction travel mode is executed.

Next, using the above equation, an operation of the autonomous traveling vehicle 100 when the reproduction travel mode is executed in Step S3 of FIG. 6A is described with reference to FIG. 6D. FIG. 6D is a flowchart illustrating an operation of the autonomous traveling vehicle 100 when the reproduction travel mode is executed.

Figure 10:
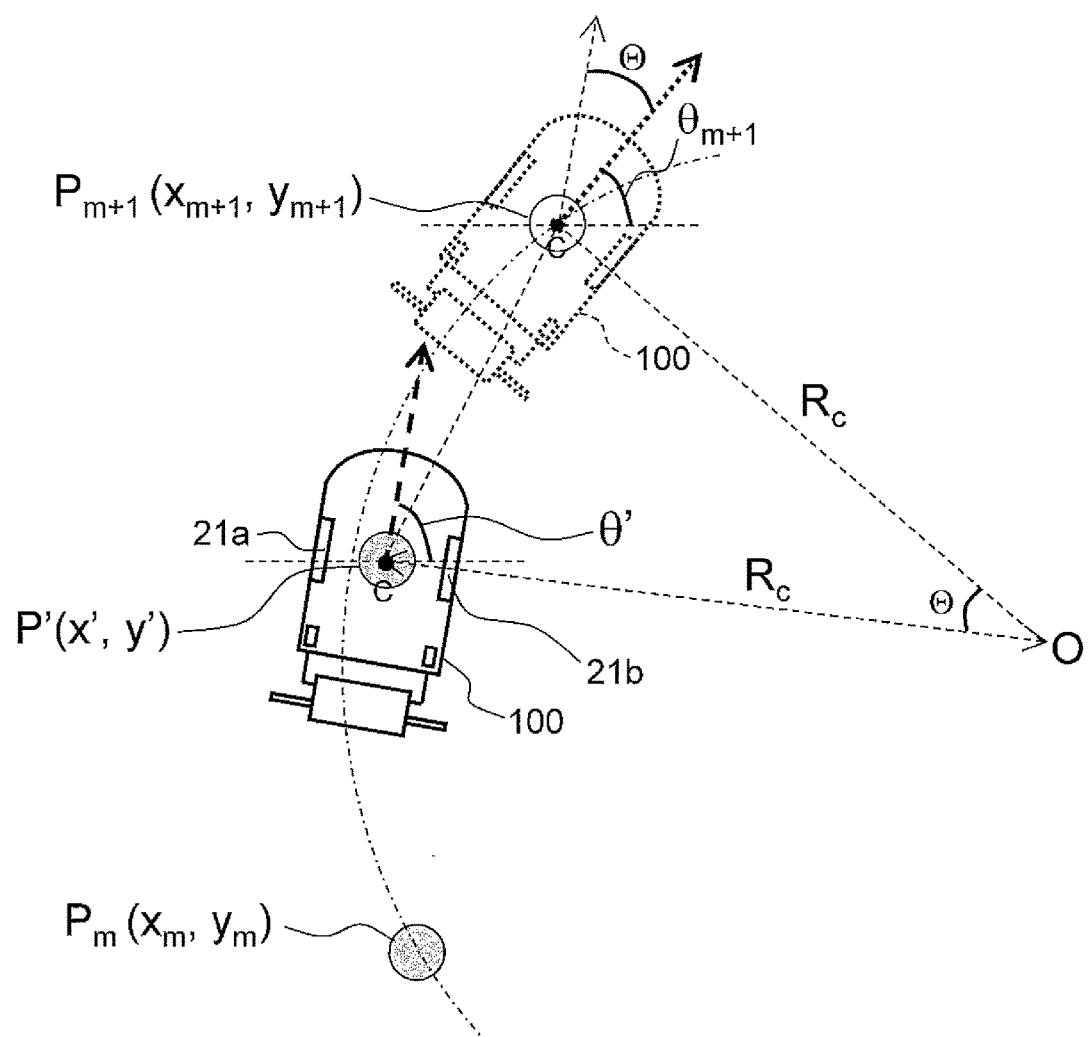
FIG. 10 is a diagram illustrating an example of a movement of the autonomous traveling vehicle from a key subgoal point to a next subgoal point.

In the following description, a case where the autonomous traveling vehicle 100 is traveling from a subgoal point $P_m$ to a next subgoal point $P_{m+1}$ as illustrated in FIG. 10 is exemplified and described. FIG. 10 is a diagram illustrating a manner in which the autonomous traveling vehicle 100 moves from the current position P' to the subgoal point $P_{m+1}$.

First, when the autonomous traveling vehicle 100 starts the reproduction travel, the user switches the travel mode to the reproduction travel mode using the mode controller 53 or the like (Step S31). In this case, when receiving the switching of the travel mode to the reproduction travel mode, the switch 77 instructs the drive switch 751 to connect the terminal e and the terminal f. As a result, the motor controller 755 controls the first motor 23a and the second motor 23b based on the reproduction travel command generated by the reproduction travel command unit 753.

Next, the position estimating unit 72 estimates coordinate values and an direction angle of the autonomous traveling vehicle 100 at the current position P' (Step S32). It is supposed that the position estimating unit 72 estimates the current position of the autonomous traveling vehicle 100 to be P' (x', y') and estimates the direction angle of the autonomous traveling vehicle 100 at the current position P' to be $\theta'$.

Since the position estimating unit 72 estimates the current position P' and the direction angle at the current position, the current position P' and direction angle at the current position is able to be estimated accurately in consideration of an influence of slip and the like of the first main wheel 21a and the second main wheel 21b. As a result, rotation speeds of the first main wheel 21a and the second main wheel 21b are able to be controlled so as to travel faithfully along the planned traveling route indicated in the planned traveling route data 500c.

After estimating the coordinate values (x', y') of the current position P' and the direction angle θ' of the autonomous traveling vehicle 100, the control parameter adjustment unit 757 extracts the key curvature radius R from the planned traveling route data 500c in order to determine the optimal control parameter $K_p$ (Step S33).

The autonomous traveling vehicle 100 is currently traveling from the subgoal point $P_m$ to the subgoal point $P_{m+1}$, and hence the key curvature radius $R_m$ associated with the subgoal point $P_m$ is extracted as the key curvature radius R.

After the key curvature radius $R_m$ is extracted, the control parameter adjustment unit 757 determines the optimal control parameter $K_p$ for traveling from the current position P' to the next target travel point (subgoal point $P_{m+1}$) based on the extracted key curvature radius $R_m$, (Step S34).

Figure 11:
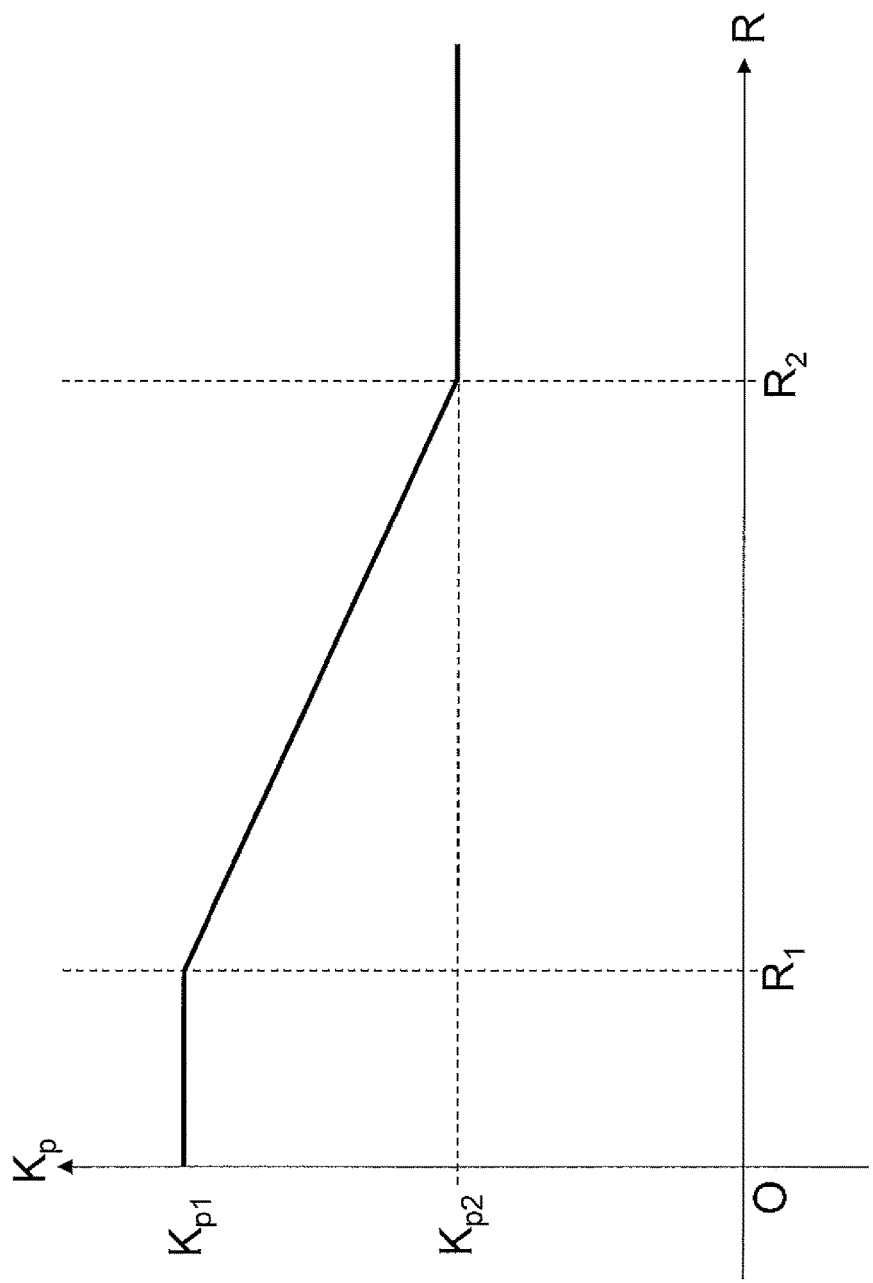
FIG. 11 is a diagram illustrating a relationship between a key curvature radius and a control parameter.

Specifically, the control parameter adjustment unit 757 determines the optimal control parameter $K_p$ by using an R-$K_p$ graph expressing a relationship between the key curvature radius R and the control parameter $K_p$. In this preferred embodiment, the R-$K_p$ graph as illustrated in FIG. 11 is used to determine the optimal $K_p$. FIG. 11 is a diagram illustrating the relationship (the R-$K_p$ graph) between the key curvature radius R and the control parameter $K_p$ in this preferred embodiment.

For instance, the control parameter $K_p$ is determined based on the key curvature radius R by using the R-$K_p$ graph illustrated in FIG. 11 as follows:

(i) if $R \leq R_1$, $K_p$ is $K_{p1}$ (a constant value);
(ii) if $R \leq R_2$, $K_p$ is $K_{p2}$ ($K_{p1} > K_{p2}$) (a constant value); and
(iii) if $R_1 < R < R_2$, $K_p$ is A-B×R.

Further, if $R = R_1$ in (iii), $K_p = A - B \times R_1$ equals to $K_{p1}$. If $R = R_2$ in (iii), $K_p = A - B \times R_2$ equals to $K_{p2}$. In this way, the control parameter $K_p$ varies continuously with respect to a value of the key curvature radius R as illustrated in FIG. 11.

In addition, the control parameter $K_p$ is $K_{p1}$ if the key curvature radius R is smaller than the first curvature radius $R_1$, while $K_p$ is $K_{p2}$ if the key curvature radius R is larger than the second curvature radius $R_2$, and $K_{p1} > K_{p2}$ holds. In other words, the control parameter adjustment unit 757 determines the control parameter $K_p$ so that the control parameter $K_p$ becomes larger as the key curvature radius R becomes smaller (as the curvature of the partial planned traveling route becomes tighter), while the control parameter $K_p$ becomes smaller as the key curvature radius R becomes larger (as the curvature of the partial planned traveling route becomes milder).

In this way, because the control parameter $K_p$ is set larger as the key curvature radius R is smaller, while the control parameter $K_p$ is set smaller as the key curvature radius R is larger, it is possible to calculate a larger direction angle feedback control amount (second rotation speed $V_2$) for a tighter curvature of the partial planned traveling route and a smaller direction angle feedback control amount for a milder curvature of the partial planned traveling route, with respect to the same speed deviation (and the same direction angle difference).

Next, the reproduction travel command unit 753 generates the reproduction travel command, which is a target value of the first main wheel rotation speed $V_a$ of the first main wheel 21a and the second main wheel rotation speed $V_b$ of the second main wheel 21b (Step S35). Specifically, the reproduction travel command unit 753 generates the reproduction travel command as follows.

First, the reproduction travel command unit 753 reads coordinate values $(x_{m+1}, y_{m+1})$ of the subgoal point $P_{m+1}$ from the subgoal point coordinate value aggregate storage area $G_s$ of the planned traveling route data 500c. In addition, the reproduction travel command unit 753 reads out an direction angle $\theta_{m+1}$ associated with the subgoal point $P_{m+1}$ stored in the direction information aggregate storage area $G_\theta$ of the planned traveling route data 500c.

After that, the reproduction travel command unit 753 calculates the reproduction travel command, which is the first main wheel rotation speed $V_a$ and the second main wheel rotation speed $V_b$ when moving from the current position P' to the subgoal point $P_{m+1}$.

Specifically, the reproduction travel command unit 753 first calculates the turning angle Θ when the autonomous traveling vehicle 100 moves from current position P' to the subgoal point $P_{m+1}$. The turning angle Θ is calculated as a difference between the direction angle $\Theta_{m+1}$ at the subgoal point $P_{m+1}$ and the direction angle θ' at the current position P' estimated in Step S32 (the direction angle difference), namely $\theta_{m+1} - \theta'$.

Next, the reproduction travel command unit 753 calculates the second rotation speed $V_2$ as $V_2 = K_p \times V_d \times (\theta_{m+1} - \theta')$ using the direction angle difference $\theta_{m+1} - \theta1'$ calculated above.

In addition, the first rotation speed $V_1$ may be calculated based on the above theoretical equation $V_1 = Vc = R_C \times \Theta / T_c$. Here, $T_c$ is the control period. In addition, the center curvature radius $R_C$ is able to be calculated as follows, for example.

First, a straight line distance between the current position P'(x', y') and the subgoal point $P_{m+1}(x_{m+1}, y_{m+1})$ is calculated as $\{(x_{m+1}-x')^2 + (y_{m+1}-y')^2\}^{0.5}$. Further, the center curvature radius $R_C$ is able to be calculated by using the following equation. The following equation is able to be derived by applying the cosine formula to the isosceles triangle P'O$P_{m+1}$ illustrated in FIG. 10.

$$R_C^2 = \{(x_{m+1}-x')^2 + (y_{m+1}-y')^2\}/(2 - 2\cos\Theta)$$

As understood from the above equation, because the first rotation speed $V_1$ is calculated by using the above theoretical equation, the first rotation speed $V_1$ is able to be expressed using a distance between the current position P' and the subgoal point $P_{m+1}(x_{m+1}, y_{m+1})$ and the turning angle (the direction angle difference) Θ. Accordingly, even if the current position P' is deviated from the original position or if the direction at the current position P' is deviated from the original direction, the generated position deviation and/or direction deviation is able to be reduced before reaching the next target travel point (the subgoal point $P_{m+1}$).

Next, the reproduction travel command unit 753 calculates the first main wheel rotation speed $V_a$ and the second main wheel rotation speed $V_b$ by using the calculated first rotation speed $V_1$ and second rotation speed $V_2$. Here, it is considered whether each the first main wheel rotation speed $V_a$ and the second main wheel rotation speed $V_b$ is expressed as a sum or a difference of the first rotation speed $V_1$ and the second rotation speed $V_2$.

As expressed by the above equation, according to the definition of the direction angle θ illustrated in FIG. 4, the second rotation speed $V_2$ becomes a negative value when turning right, while it becomes a positive value when turning left. It is because that as illustrated in FIG. 10, when the autonomous traveling vehicle 100 turns right, the direction angle $\theta_{m+1}$ after the turning is smaller than the direction angle θ' before the turning. On the contrary, when turning left, the direction angle $\theta_{m+1}$ after the turning is larger than the direction angle θ' after the turning.

As illustrated in FIG. 10, the first main wheel 21a becomes the outside main wheel when turning right, while it becomes the inside main wheel when turning left. Accordingly, the first main wheel rotation speed $V_a$ becomes larger than the first rotation speed $V_1$ by the second rotation speed $V_2$ when turning right, while it becomes smaller than the first rotation speed $V_1$ by the second rotation speed $V_2$ when turning left. Further, the second rotation speed $V_2$ becomes a negative value when turning right, while it becomes a positive value when turning left.

Accordingly, in the definition of the direction angle θ in this preferred embodiment illustrated in FIG. 4, the first main wheel rotation speed $V_a$ is expressed as a difference $(V_1-V_2)$ between the first rotation speed $V_1$ and the second rotation speed $V_2$. Accordingly, the first main wheel rotation speed $V_a$ is calculated as follows.

$$V_a = V_1 - K_p \times V_d \times (\theta_{m+1} - \theta')$$

On the other hand, the second main wheel 21b becomes the outside main wheel when turning left, while it becomes the inside main wheel when turning right. Accordingly, the second main wheel rotation speed $V_b$ becomes larger than the first rotation speed $V_1$ by the second rotation speed $V_2$ when turning left, while it becomes smaller than the first rotation speed $V_1$ by the second rotation speed $V_2$ when turning right. Accordingly, in the definition of the direction angle θ in this preferred embodiment illustrated in FIG. 4, the first main wheel rotation speed $V_a$ is expressed as a sum $(V_1+V_2)$ of the first rotation speed $V_1$ and the second rotation speed $V_2$. Accordingly, the second main wheel rotation speed $V_b$ is calculated as follows.

$$V_b = V_1 + K_p \times V_d \times (\theta_{m+1} - \theta')$$

Further, if the turning angle (the direction angle difference) $\theta = m+'-\theta$ is zero, the autonomous traveling vehicle 100 travels from the current position P' to the subgoal point $P_{m+1}$ by the shortest distance. In this case, the second rotation speed $V_2$ becomes zero. On the other hand, the first rotation speed $V_1$ may be calculated as follows.

$$V_1 = \{(x_{m+1}-x')^2 + (y_{m+1}-y')^2\}^{0.5}/T_c$$

Because the reproduction travel command unit 753 calculates the first main wheel rotation speed $V_a$ and the second main wheel rotation speed $V_b$ based on the direction angle difference (turning angle) 8 as described above, even if the current position or the direction angle is deviated from the original position or the direction angle due to a slip between the main wheel and the traveling surface, the direction (the direction angle) of the autonomous traveling vehicle 100 is able to be controlled so that the deviation from the original position or the direction angle is reduced at the next target travel point.

In addition, because the reproduction travel command unit 753 calculates the first main wheel rotation speed $V_a$ and the second main wheel rotation speed $V_b$ based on the control parameter $K_p$ optimized based on the key curvature radius R, a higher rotation speed is able to be output as a command value if the curvature of the partial planned traveling route is tighter, while a lower rotation speed is able to be output as the command value if the curvature of the partial planned traveling route is lesser, with respect to the same direction angle difference.

As a result, optimal travel is able to be performed in accordance with a shape (curvature) of the planned traveling route. In other words, if the curvature of the partial planned traveling route is greater, the first main wheel 21a and the second main wheel 21b are able to more quickly reach a target first main wheel rotation speed $V_a$ and a target second main wheel rotation speed $V_b$. On the other hand, if the curvature of the partial planned traveling route is lesser, the first main wheel 21a and the second main wheel 21b are able to be prevented from being excessively controlled.

Further, because the reproduction travel command unit 753 calculates the first main wheel rotation speed $V_a$ and the second main wheel rotation speed $V_b$ as the product of the direction angle difference and the control parameter $K_p$ optimized based on the key curvature radius R, even if the direction angle θ' at the current position P' is deviated from the original direction angle, the deviation of the direction angle $\theta_{i+1}$ is able to be reduced at the next target travel point $P_{i+1}$ without excessive control of the direction of the autonomous traveling vehicle 100 or insufficient control amount of the direction. As a result, the autonomous traveling vehicle 100 is able to travel while faithfully reproducing the planned traveling route taught when the reproduction travel mode is executed.

As described above, after calculating the first main wheel rotation speed $V_a$ and the second main wheel rotation speed $V_b$, the reproduction travel command unit 753 outputs the calculated first main wheel rotation speed $V_a$ and second main wheel rotation speed $V_b$ to the motor controller 755 via the drive switch 751.

After receiving the first main wheel rotation speed $V_a$ and the second main wheel rotation speed $V_b$ calculated in Step S35, the motor controller 755 controls rotation speeds of the first motor 23a and the second motor 23b based on the calculated first main wheel rotation speed $V_a$ and second main wheel rotation speed $V_b$, respectively (Step S36).

Specifically, the motor controller 755 controls rotation speeds of the first motor 23a and the second motor 23b so that the actual first main wheel rotation speed $V_a$ (act) and second main wheel rotation speed $V_b$ (act) measured by the encoders 231a and 231b or the like follow the calculated first main wheel rotation speed $V_a$ and second main wheel rotation speed $V_b$, respectively.

Accordingly, control amounts $Q_1$ and $Q_2$ output from the motor controller 755 to the first motor 23a and the second motor 23b are determined respectively based on a difference between the actual first main wheel rotation speed $V_a$ (act) and the calculated first main wheel rotation speed $V_a$, and a difference between the second main wheel rotation speed $V_b$ (act) and the second main wheel rotation speed $V_b$.

After controlling the rotation speeds of the first motor 23a and the second motor 23b in Step S36, the motor driving unit 75 checks whether or not the autonomous traveling vehicle 100 has reached the travel end position (Step S37).

The motor driving unit 75 determines whether or not all the subgoal points (and the direction angles) in the planned traveling route data 500c are read out, for example, so as to check whether or not the autonomous traveling vehicle 100 has reached the travel end position. Whether or not all the subgoal points in the planned traveling route data 500c are read out is able to be determined, for example, by checking whether or not the reproduction travel command unit 753 has read an identifier indicating an end of an electronic file of the planned traveling route data 500c (e.g., an "End Of File" identifier).

If it is determined that the autonomous traveling vehicle 100 has reached the travel end position ("Yes" in Step S37), execution of the reproduction travel mode is stopped.

On the other hand, if it is determined that the autonomous traveling vehicle 100 has not reached the travel end position ("No" in Step S37), Steps S32 to S36 are repeated.

In this way, the autonomous traveling vehicle 100 is able to travel while faithfully reproducing the planned traveling route indicated in the planned traveling route data 500c based on the planned traveling route data 500c.

The effects of the first preferred embodiment are described as follows.

The autonomous traveling vehicle 100 (an example of the autonomous traveling vehicle) is an autonomous traveling vehicle that executes the teaching travel mode (an example of the teaching travel mode) to teach the planned traveling route (an example of the planned traveling route) and the reproduction travel mode (an example of the reproduction travel mode) to travel autonomously while reproducing the planned traveling route.

The autonomous traveling vehicle 100 includes the platform 1, the traveling unit 2 (an example of the traveling unit), the teaching unit 71 (an example of the teaching unit), the curvature calculation unit 74 (an example of the curvature calculation unit), and the control parameter adjustment unit 757 (an example of the control parameter adjustment unit).

The traveling unit 2 is mounted on the platform 1. In addition, the traveling unit 2 controls the platform 1 to travel.

The teaching unit 71 acquires the subgoal points $P_k$ (an example of the subgoal points) (k=0, 1, 2, . . . , m, . . . n) when the teaching travel mode is executed. Further, the teaching unit 71 stores the planned traveling route data 500a (an example of the planned traveling route data) as an aggregate of the subgoal points $P_k$.

The curvature calculation unit 74 calculates and stores the key curvature radius R (an example of the key curvature radius). When the reproduction travel mode is executed, the control parameter adjustment unit 757 adjusts the control parameter $K_p$ (an example of the control parameter) to determine the direction angle feedback control amount of the traveling unit 2 (an example of the control amount) based on the key curvature radius R calculated by the curvature calculation unit 74.

In the autonomous traveling vehicle 100, when the teaching travel mode is executed, the teaching unit 71 first acquires and stores the planned traveling route data 500a as the aggregate of subgoal points $P_k$. Next, the curvature calculation unit 74 uses the stored planned traveling route data 500a so as to calculate the key curvature radius $R_m$ at the key subgoal point $P_{am}$ (an example of the key subgoal point) as each of the subgoal points included in the planned traveling route data 500a and stores the same in the planned traveling route data 500c. In addition, when the autonomous traveling vehicle 100 travels while reproducing the planned traveling route based on the planned traveling route data 500c (when the reproduction travel mode is executed), the control parameter adjustment unit 757 adjusts the control parameter $K_p$ based on the calculated key curvature radius R. Further, the direction angle feedback control amount of the traveling unit 2 is determined by using the adjusted control parameter $K_p$.

In this way, the autonomous traveling vehicle 100 (the platform 1) is able to optimally travel in accordance with a shape (curvature) of the planned traveling route. It is because that the control parameter adjustment unit 757 adjusts the control parameter $K_p$ based on the key curvature radius R, and as a result the direction angle feedback control amount to control the traveling unit 2 is calculated based on the control parameter $K_p$ adjusted based on the key curvature radius R.

Accordingly, when the reproduction travel mode is executed, the autonomous traveling vehicle 100 is able to travel while faithfully reproducing the taught planned traveling route.

In the autonomous traveling vehicle 100, the traveling unit 2 includes the first main wheel 21a (an example of the first main wheel), and the second main wheel 21b (an example of the second main wheel). In addition, the second main wheel 21b is disposed to face the first main wheel 21a. Further, the first main wheel rotation speed $V_a$ (an example of the first main wheel rotation speed) and the second main wheel rotation speed $V_b$ (an example of the second main wheel rotation speed) include the first rotation speed $V_1$ (an example of the first rotation speed) and the second rotation speed $V_2$ (an example of the second rotation speed). Further, the second rotation speed $V_2$ is controlled based on the direction angle feedback control amount.

In this way, the position and the direction of the opposed two-wheel differential type traveling unit 2 including the first main wheel 21a and the second main wheel 21b is able to be controlled.

In the autonomous traveling vehicle 100, the direct ion angle feedback control amount is calculated based on the product of the control parameter $K_p$ and the direction angle difference $\theta_{m+1}-\theta'$ (an example of the direction angle difference).

In this way, even if the position and/or the direction of the platform 1 (the autonomous traveling vehicle 100) at the current position P' is deviated from the original position and/or direction, due to a slip of the first main wheel 21a and the second main wheel 21b of the traveling unit 2, the deviation is able to be reduced at the next target travel point $P_{m+1}$.

Further, the autonomous traveling vehicle 100 is able to optimally travel in accordance with a shape (curvature) of the planned traveling route. As a result, the autonomous traveling vehicle 100 is able to travel while faithfully reproducing the taught planned traveling route when the reproduction travel mode is executed.

In the autonomous traveling vehicle 100, the planned traveling route data 500c stores the key curvature radius R in association with the subgoal point $P_k$.

In this way, the control parameter adjustment unit 757 extracts the key curvature radius R from the planned traveling route data 500c so as to determine the optimal control parameter $K_p$ at each subgoal point based on the key curvature radius R.

In the autonomous traveling vehicle 100, the planned traveling route data 500c stores the direction angle $\theta$ (an example of the direction angle) in association with the subgoal point $P_k$. In this way, when the teaching travel mode is executed, the direction of the platform 1 at the subgoal point P is able to be stored in the planned traveling route data 500c. As a result, when the reproduction travel mode is executed, the autonomous traveling vehicle 100 faithfully reproduces the direction in the taught planned traveling route based on the planned traveling route data 500c.

In the autonomous traveling vehicle 100, the partial planned traveling route (an example of the partial planned traveling route) is a traveling route including three points, which are the key subgoal point $P_{am}$ (an example of the key subgoal point), the first subgoal point $P_{f(m+H)}$ (an example of the first subgoal point), and the second subgoal point $P_{s(m-I)}$ (an example of the second subgoal point).

In addition, the first subgoal point $P_{f(m+H)}$ and the second subgoal point $P_{s(m+I)}$ are the subgoal points $P_k$ closest to the key subgoal point $P_{am}$ among the subgoal points $P_k$ separated from the key subgoal point $P_{am}$ by a predetermined distance (an example of a predetermined distance) or longer.

In this way, it is possible to calculate the key curvature radius R of the partial planned traveling route in which an influence of a local unevenness of the route generated by a noise component is reduced.

In the autonomous traveling vehicle 100, the curvature calculation unit 74 calculates the radius r (an example of the radius) of the key circle (an example of the key circle) as the key curvature radius R. In this way, the curvature calculation unit 74 calculates key curvature radius R more easily.

In the autonomous traveling vehicle 100, the direct ion angle feedback control amount is calculated every predetermined control period $T_c$ (an example of the control period). In this way, the traveling unit 2 is able to be controlled without delay in consideration of a calculation load and the like.

The autonomous traveling vehicle 100 further includes the position estimating unit 72 (an example of the position estimating unit).

In this way, the position and the direction of the platform 1 (the autonomous traveling vehicle 100) is able to be accurately estimated. As a result, the planned traveling route taught by the user is able to be faithfully reproduced as the planned traveling route data 500c. In addition, by accurately estimating the position and the direction of the autonomous traveling vehicle 100, the traveling unit 2 is able to be accurately controlled so that the autonomous traveling vehicle 100 faithfully travels along the planned traveling route.

The planned traveling route data 500c includes the subgoal point coordinate value aggregate storage area $G_s$ (an example of the subgoal point coordinate value aggregate storage area) and the key curvature radius aggregate storage area $G_R$ (an example of the key curvature radius aggregate storage area). The subgoal point coordinate value aggregate storage area $G_s$ stores the subgoal point $P_k$ as an aggregate of coordinate values. The key curvature radius aggregate storage area $G_R$ stores an aggregate of the key curvature radii R.

Further, when the autonomous traveling vehicle 100 autonomously travels along the planned traveling route based on the planned traveling route data 500c, the control parameter $K_p$ to determine the direction angle feedback control amount of the traveling unit 2 of the autonomous traveling vehicle 100 is determined based on the key curvature radius R stored in the key curvature radius aggregate storage area $G_R$.

Using the planned traveling route data 500c having this data structure, when the reproduction travel mode is executed, the autonomous traveling vehicle 100 is able to optimally travel along a shape (curvature) in accordance with the planned traveling route. It is because that the control parameter $K_p$ is adjusted based on the key curvature radius R. As a result, the direction angle feedback control amount to control the traveling unit 2 is able to be calculated based on the control parameter $K_p$ adjusted based on the key curvature radius R.

Accordingly, when the reproduction travel mode is executed, the autonomous traveling vehicle 100 is able to travel while faithfully reproducing the taught planned traveling route.

The planned traveling route data 500c further includes the direction information aggregate storage area $G_\theta$ (an example of the direction information aggregate storage area). The direction information aggregate storage area $G_\theta$ stores an aggregate of direction angles θ that is information of the direction of the autonomous traveling vehicle 100 at the subgoal point $P_k$.

In this way, when the reproduction travel mode is executed, the autonomous traveling vehicle 100 can faithfully reproduce the direction in the taught planned traveling route based on the planned traveling route data 500c.

Other Preferred Embodiments

Although preferred embodiments of the present invention are described above, the present invention is not limited to the preferred embodiments described above but is able to be variously modified within the scope of the spirit of the present invention. In particular, the elements or features of the preferred embodiments and variations described in this specification is able to be arbitrarily combined as necessary.

In the first preferred embodiment described above, in order to calculate the key curvature radius R of the partial planned traveling route without an influence of a noise component contained in the planned traveling route data 500a, the subgoal points P that are closest to the key subgoal point $P_a$ among the subgoal points P separated from the key subgoal point $P_a$ by more than a predetermined distance preferably are selected as the first subgoal point $P_f$ and the second subgoal point $P_s$. However, this is not a limitation.

In order to calculate the key curvature radius R of the partial planned traveling route without an influence of a noise component, an appropriate data processing may be performed on the planned traveling route data 500a acquired in the teaching travel mode. For instance, an average value of the key subgoal point $P_a$ and a predetermined number of subgoal points P before and after the key subgoal point $P_a$ may be calculated, and the calculated average value may be used as the new key subgoal point $P_a$ for generating new planned traveling route data 500a. By performing this data processing on the planned traveling route data 500a, a noise component contained in the planned traveling route data 500a is also able to be removed.

Further, in this case, the curvature calculation unit 74 uses the planned traveling route data 500a after the above data processing so as to calculate the key curvature radius R.

In the first preferred embodiment described above, the curvature calculation unit 74 preferably calculates the radius r of the key circle passing the key subgoal point $P_a$, the first subgoal point $P_f$ and the second subgoal point $P_s$, as the key curvature radius R. However, this is not a limitation. As the key curvature radius, the curvature calculation unit 74 may calculate an angle at the key subgoal point $P_a$ (a key point angle) of a triangle defined by the key subgoal point $P_a$, the first subgoal point $P_f$ and the second subgoal point $P_s$, and may store the key point angle in the planned traveling route data 500a. In this case, the smaller the key point angle is, the tighter the curvature of the partial planned traveling route becomes.

Further, in this case, the control parameter adjustment unit 757 adjusts the control parameter $K_p$ based on the key point angle.

In this way, when the curvature calculation unit 74 calculates the key point angle as the key curvature radius, the control parameter $K_p$ is also able to be adjusted in accordance with a shape of the (sub) planned traveling route.

In the autonomous traveling vehicle 100 of the first preferred embodiment, the planned traveling route taught by the user preferably is stored as the planned traveling route data 500a and 500c as an aggregate of the subgoal points P, and the autonomous traveling vehicle 100 autonomously travels based on the planned traveling route data 500c. However, the planned traveling route is not limited to the form stored as the planned traveling route data.

For instance, like in an automatic guided vehicle (AGV, an unmanned vehicle), a rail, a magnetic tape, or the like may be used for indicating a route of travel (the planned traveling route). In this case, for example, an appropriate sensor or the like detects a shape of the route formed of the magnetic tape or the like, and the control parameter to determine the control amount of wheels of the vehicle such as AGV is able to be adjusted based on the detected curvature (curvature radius) of the route.

Preferred embodiments of the present invention are able to be widely applied to control of an autonomous traveling vehicle.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. An autonomous traveling vehicle that executes a teaching travel mode in which a planned traveling route is taught, and a reproduction travel mode in which the autonomous travelling vehicle travels autonomously while reproducing the planned traveling route, the planned traveling route being a traveling route taught by a user when traveling from a travel start position to a travel end position, the autonomous traveling vehicle comprising:
   a platform;
   a traveling unit mounted on the platform to control the platform to travel; and
   a controller including a processor that is configured or programmed to include:
      a teaching unit that acquires subgoal points when the teaching travel mode is executed and stores planned traveling route data expressing the planned traveling route as an aggregate of subgoal points, the subgoal points being information of positions through which the platform passes from the travel start position to the travel end position in a travel environment;
      a curvature calculation unit that calculates and stores a key curvature radius of a partial planned traveling route at a key subgoal point, the key subgoal point being one of the subgoal points included in the planned traveling route data, the partial planned traveling route including the key subgoal point and a predetermined number of subgoal points before and after the key subgoal point in the planned traveling route data; and
      a control parameter adjustment unit that adjusts a control parameter to determine a control amount of the traveling unit based on the key curvature radius calculated by the curvature calculation unit, when the reproduction travel mode is executed; wherein
   the control amount is calculated based on a product of the control parameter and a direction angle difference between a direction angle indicating a current direction of the platform and a direction angle indicating a direction of the platform at a next target travel point.

2. The autonomous traveling vehicle according to claim 1, wherein
   the traveling unit includes a first main wheel and a second main wheel disposed to face the first main wheel;
   a first main wheel rotation speed of the first main wheel includes a first rotation speed and a second rotation speed, and a second main wheel rotation speed of the second main wheel includes a first rotation speed and a second rotation speed; and
   the second rotation speed is controlled based on the control amount.

3. The autonomous traveling vehicle according to claim 1, wherein the planned traveling route data contains the key curvature radius in association with the subgoal point.

4. The autonomous traveling vehicle according to claim 1, wherein the planned traveling route data contains a direction angle at the subgoal point in association with the subgoal point.

5. The autonomous traveling vehicle according to claim 1, wherein
   the partial planned traveling route is a traveling route including the key subgoal point, a first subgoal point before the key subgoal point in a traveling direction, and a second subgoal point after the key subgoal point in the traveling direction; and
   the first subgoal point and the second subgoal point are subgoal points closest to the key subgoal point among the subgoal points separated from the key subgoal point by a predetermined distance or more.

6. The autonomous traveling vehicle according to claim 1, wherein the curvature calculation unit calculates, as the key curvature radius, a radius of a key circle that passes a predetermined number of subgoal points included in the partial planned traveling route.

7. The autonomous traveling vehicle according to claim 1, wherein a predetermined control period is selected and the control amount is calculated every predetermined control period.

8. The autonomous traveling vehicle according to claim 1, wherein the processor is configured or programmed to further include a position estimating unit that estimates the position and/or the direction of the platform.

9. A method of a reproduction travel in which an autonomous traveling vehicle, which includes a platform, a traveling unit, and a controller including a processor, autonomously travels while reproducing a planned traveling route, the processor being configured or programmed to perform the method comprising:
   calculating a key curvature radius of a partial planned traveling route at a key subgoal point, the key subgoal point being one of subgoal points included in planned traveling route data expressing the planned traveling route, the partial planned traveling route including the key subgoal point and a predetermined number of subgoal points before and after the key subgoal point in the planned traveling route data;
   adjusting a control parameter based on the key curvature radius; and
   determining a control amount to control the autonomous traveling vehicle to perform the reproduction travel based on the control parameter; wherein
   the control amount is calculated based on a product of the control parameter and a direction angle difference between a direction angle indicating a current direction of a platform and a direction angle indicating a direction of the platform at a next target travel point.

* * * * *